(12) United States Patent
Bell

(10) Patent No.: US 10,711,574 B2
(45) Date of Patent: Jul. 14, 2020

(54) INTERCHANGEABLE SWIVEL COMBINED MULTICOUPLER

(71) Applicant: Weatherford Technology Holdings, LLC, Houston, TX (US)

(72) Inventor: Michael Thomas Bell, Houston, TX (US)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 320 days.

(21) Appl. No.: 15/607,159

(22) Filed: May 26, 2017

(65) Prior Publication Data
US 2018/0340398 A1 Nov. 29, 2018

(51) Int. Cl.
| E21B 19/00 | (2006.01) |
| E21B 41/00 | (2006.01) |
| E21B 3/02 | (2006.01) |
| E21B 19/16 | (2006.01) |

(52) U.S. Cl.
CPC ............... *E21B 41/00* (2013.01); *E21B 3/02* (2013.01); *E21B 19/00* (2013.01); *E21B 19/16* (2013.01)

(58) Field of Classification Search
CPC .......... E21B 41/00; E21B 3/02; E21B 19/161; E21B 19/165; E21B 19/16
See application file for complete search history.

(56) References Cited

U.S. PATENT DOCUMENTS

| 1,367,156 A | 2/1921 | McAlvay et al. |
| 1,610,977 A | 12/1926 | Scott |
| 1,822,444 A | 9/1931 | MacClatchie |
| 2,370,354 A | 2/1945 | Hurst |
| 3,147,992 A | 9/1964 | Haeber et al. |
| 3,354,951 A | 11/1967 | Savage et al. |
| 3,385,370 A | 5/1968 | Knox et al. |
| 3,662,842 A | 5/1972 | Bromell |
| 3,698,426 A | 10/1972 | Litchfield et al. |
| 3,747,675 A | 7/1973 | Brown |
| 3,766,991 A | 10/1973 | Brown |
| 3,774,697 A | 11/1973 | Brown |
| 3,776,320 A | 12/1973 | Brown |

(Continued)

FOREIGN PATENT DOCUMENTS

| AU | 2012201644 A1 | 4/2012 |
| AU | 2013205714 A1 | 5/2013 |

(Continued)

OTHER PUBLICATIONS

Canadian Office Action in related application CA 2,955,754 dated Jul. 17, 2018.

(Continued)

*Primary Examiner* — Yong-Suk Ro
(74) *Attorney, Agent, or Firm* — Patterson + Sheridan, LLP

(57) ABSTRACT

A combined multicoupler for connecting a tool to a top drive is disclosed. The combined multicoupler includes a load frame comprising a frame body having a load shoulder, and a side door coupled to the frame body. The side door opens from the frame body to allow a tool sliding horizontally into the load shoulder, and the side door closes to lock the tool in the load frame. The combined multicoupler further comprises a drive stem movably coupled to the load frame, wherein the drive stem moves vertically to connect and disconnect with the tool in the load frame.

23 Claims, 13 Drawing Sheets

(56) References Cited

U.S. PATENT DOCUMENTS

| | | |
|---|---|---|
| 3,842,619 A | 10/1974 | Bychurch, Sr. |
| 3,888,318 A | 6/1975 | Brown |
| 3,899,024 A | 8/1975 | Tonnelli et al. |
| 3,913,687 A | 10/1975 | Gyongyosi et al. |
| 3,915,244 A | 10/1975 | Brown |
| 3,964,552 A | 6/1976 | Slator |
| 4,022,284 A | 5/1977 | Crow |
| 4,051,587 A | 10/1977 | Boyadjieff |
| 4,100,968 A | 7/1978 | Delano |
| 4,192,155 A | 3/1980 | Gray |
| 4,199,847 A | 4/1980 | Owens |
| 4,235,469 A | 11/1980 | Denny et al. |
| 4,364,407 A | 12/1982 | Hilliard |
| 4,377,179 A | 3/1983 | Giebeler |
| 4,402,239 A | 9/1983 | Mooney |
| 4,449,596 A | 5/1984 | Boyadjieff |
| 4,478,244 A | 10/1984 | Garrett |
| 4,497,224 A | 2/1985 | Jürgens |
| 4,593,773 A | 6/1986 | Skeie |
| 4,762,187 A | 8/1988 | Haney |
| 4,776,617 A | 10/1988 | Sato |
| 4,779,688 A | 10/1988 | Baugh |
| 4,791,997 A | 12/1988 | Krasnov |
| 4,813,493 A | 3/1989 | Shaw et al. |
| 4,815,546 A | 3/1989 | Haney et al. |
| 4,821,814 A | 4/1989 | Willis et al. |
| 4,844,181 A | 7/1989 | Bassinger |
| 4,867,236 A | 9/1989 | Haney et al. |
| 4,955,949 A | 9/1990 | Bailey et al. |
| 4,962,819 A | 10/1990 | Bailey et al. |
| 4,972,741 A | 11/1990 | Sibille |
| 4,981,180 A | 1/1991 | Price |
| 4,997,042 A | 3/1991 | Jordan et al. |
| 5,036,927 A | 8/1991 | Willis |
| 5,099,725 A | 3/1992 | Bouligny, Jr. et al. |
| 5,152,554 A | 10/1992 | LaFleur et al. |
| 5,172,940 A | 12/1992 | Usui et al. |
| 5,191,939 A | 3/1993 | Stokley |
| 5,215,153 A | 6/1993 | Younes |
| 5,245,877 A | 9/1993 | Ruark |
| 5,282,653 A | 2/1994 | LaFleur et al. |
| 5,297,833 A | 3/1994 | Willis et al. |
| 5,348,351 A | 9/1994 | LaFleur et al. |
| 5,385,514 A | 1/1995 | Dawe |
| 5,433,279 A | 7/1995 | Tessari et al. |
| 5,441,310 A | 8/1995 | Barrett et al. |
| 5,456,320 A | 10/1995 | Baker |
| 5,479,988 A | 1/1996 | Appleton |
| 5,486,223 A | 1/1996 | Carden |
| 5,501,280 A | 3/1996 | Brisco |
| 5,509,442 A | 4/1996 | Claycomb |
| 5,577,566 A | 11/1996 | Albright et al. |
| 5,584,343 A | 12/1996 | Coone |
| 5,645,131 A | 7/1997 | Trevisani |
| 5,664,310 A | 9/1997 | Penisson |
| 5,682,952 A | 11/1997 | Stokley |
| 5,735,348 A | 4/1998 | Hawkins, III |
| 5,778,742 A | 7/1998 | Stuart |
| 5,839,330 A | 11/1998 | Stokka |
| 5,909,768 A | 6/1999 | Castille et al. |
| 5,918,673 A | 7/1999 | Hawkins et al. |
| 5,950,724 A | 9/1999 | Giebeler |
| 5,971,079 A | 10/1999 | Mullins |
| 5,992,520 A | 11/1999 | Schultz et al. |
| 6,003,412 A | 12/1999 | Dlask et al. |
| 6,053,191 A | 4/2000 | Hussey |
| 6,102,116 A | 8/2000 | Giovanni |
| 6,142,545 A | 11/2000 | Penman et al. |
| 6,161,617 A | 12/2000 | Gjedebo |
| 6,173,777 B1 | 1/2001 | Mullins |
| 6,276,450 B1 | 8/2001 | Seneviratne |
| 6,279,654 B1 | 8/2001 | Mosing et al. |
| 6,289,911 B1 | 9/2001 | Majkovic |
| 6,309,002 B1 | 10/2001 | Bouligny |
| 6,311,792 B1 | 11/2001 | Scott et al. |
| 6,328,343 B1 | 12/2001 | Hosie et al. |
| 6,378,630 B1 | 4/2002 | Ritorto et al. |
| 6,390,190 B2 | 5/2002 | Mullins |
| 6,401,811 B1 | 6/2002 | Coone |
| 6,415,862 B1 | 7/2002 | Mullins |
| 6,431,626 B1 | 8/2002 | Bouligny |
| 6,443,241 B1 | 9/2002 | Juhasz et al. |
| 6,460,620 B1 | 10/2002 | LaFleur |
| 6,527,047 B1 | 3/2003 | Pietras |
| 6,536,520 B1 | 3/2003 | Snider et al. |
| 6,571,876 B2 | 6/2003 | Szarka |
| 6,578,632 B2 | 6/2003 | Mullins |
| 6,595,288 B2 | 7/2003 | Mosing et al. |
| 6,604,578 B2 | 8/2003 | Mullins |
| 6,622,796 B1 | 9/2003 | Pietras |
| 6,637,526 B2 | 10/2003 | Juhasz et al. |
| 6,640,824 B2 | 11/2003 | Majkovic |
| 6,666,273 B2 | 12/2003 | Laurel |
| 6,675,889 B1 | 1/2004 | Mullins et al. |
| 6,679,333 B2 | 1/2004 | York et al. |
| 6,688,398 B2 | 2/2004 | Pietras |
| 6,691,801 B2 | 2/2004 | Juhasz et al. |
| 6,705,405 B1 | 3/2004 | Pietras |
| 6,715,542 B2 | 4/2004 | Mullins |
| 6,719,046 B2 | 4/2004 | Mullins |
| 6,722,425 B2 | 4/2004 | Mullins |
| 6,725,938 B1 | 4/2004 | Pietras |
| 6,732,819 B2 | 5/2004 | Wenzel |
| 6,732,822 B2 | 5/2004 | Slack et al. |
| 6,742,584 B1 | 6/2004 | Appleton |
| 6,742,596 B2 | 6/2004 | Haugen |
| 6,779,599 B2 | 8/2004 | Mullins et al. |
| 6,832,656 B2 | 12/2004 | Fournier, Jr. et al. |
| 6,883,605 B2 | 4/2005 | Arceneaux et al. |
| 6,892,835 B2 | 5/2005 | Shahin et al. |
| 6,908,121 B2 | 6/2005 | Hirth et al. |
| 6,925,807 B2 | 8/2005 | Jones et al. |
| 6,938,697 B2 | 9/2005 | Haugen |
| 6,976,298 B1 | 12/2005 | Pietras |
| 6,994,176 B2 | 2/2006 | Shahin et al. |
| 7,000,503 B2 | 2/2006 | Dagenais et al. |
| 7,001,065 B2 | 2/2006 | Dishaw et al. |
| 7,004,259 B2 | 2/2006 | Pietras |
| 7,007,753 B2 | 3/2006 | Robichaux et al. |
| 7,017,671 B2 | 3/2006 | Williford |
| 7,021,374 B2 | 4/2006 | Pietras |
| 7,025,130 B2 | 4/2006 | Bailey et al. |
| 7,073,598 B2 | 7/2006 | Haugen |
| 7,090,021 B2 | 8/2006 | Pietras |
| 7,096,948 B2 | 8/2006 | Mosing et al. |
| 7,114,235 B2 | 10/2006 | Jansch et al. |
| 7,128,161 B2 | 10/2006 | Pietras |
| 7,137,454 B2 | 11/2006 | Pietras |
| 7,140,443 B2 | 11/2006 | Beierbach et al. |
| 7,143,849 B2 | 12/2006 | Shahin et al. |
| 7,147,254 B2 | 12/2006 | Niven et al. |
| 7,159,654 B2 | 1/2007 | Ellison et al. |
| 7,178,612 B2 | 2/2007 | Belik |
| 7,213,656 B2 | 5/2007 | Pietras |
| 7,219,744 B2 | 5/2007 | Pietras |
| 7,231,969 B2 | 6/2007 | Folk et al. |
| 7,270,189 B2 | 9/2007 | Brown et al. |
| 7,281,451 B2 | 10/2007 | Schulze Beckinghausen |
| 7,281,587 B2 | 10/2007 | Haugen |
| 7,303,022 B2 | 12/2007 | Tilton et al. |
| 7,325,610 B2 | 2/2008 | Giroux et al. |
| 7,353,880 B2 | 4/2008 | Pietras |
| 7,448,456 B2 | 11/2008 | Shahin et al. |
| 7,451,826 B2 | 11/2008 | Pietras |
| 7,490,677 B2 | 2/2009 | Buytaert et al. |
| 7,503,397 B2 | 3/2009 | Giroux et al. |
| 7,509,722 B2 | 3/2009 | Shahin et al. |
| 7,513,300 B2 | 4/2009 | Pietras et al. |
| 7,591,304 B2 | 9/2009 | Juhasz et al. |
| 7,617,866 B2 | 11/2009 | Pietras |
| 7,635,026 B2 | 12/2009 | Mosing et al. |
| 7,665,515 B2 | 2/2010 | Mullins |
| 7,665,530 B2 | 2/2010 | Wells et al. |
| 7,665,531 B2 | 2/2010 | Pietras |

(56) References Cited

U.S. PATENT DOCUMENTS

| | | |
|---|---|---|
| 7,669,662 B2 | 3/2010 | Pietras |
| 7,690,422 B2 | 4/2010 | Swietlik et al. |
| 7,694,730 B2 | 4/2010 | Angman |
| 7,694,744 B2 | 4/2010 | Shahin |
| 7,699,121 B2 | 4/2010 | Juhasz et al. |
| 7,712,523 B2 | 5/2010 | Snider et al. |
| 7,730,698 B1 | 6/2010 | Montano et al. |
| 7,757,759 B2 | 7/2010 | Jahn et al. |
| 7,779,922 B1 | 8/2010 | Harris et al. |
| 7,793,719 B2 | 9/2010 | Snider et al. |
| 7,817,062 B1 | 10/2010 | Li et al. |
| 7,828,085 B2 | 11/2010 | Kuttel et al. |
| 7,841,415 B2 | 11/2010 | Winter |
| 7,854,265 B2 | 12/2010 | Zimmermann |
| 7,866,390 B2 | 1/2011 | Latiolais, Jr. et al. |
| 7,874,352 B2 | 1/2011 | Odell, II et al. |
| 7,874,361 B2 | 1/2011 | Mosing et al. |
| 7,878,237 B2 | 2/2011 | Angman |
| 7,878,254 B2 | 2/2011 | Abdollahi et al. |
| 7,882,902 B2 | 2/2011 | Boutwell, Jr. |
| 7,896,084 B2 | 3/2011 | Haugen |
| 7,918,273 B2 | 4/2011 | Snider et al. |
| 7,958,787 B2 | 6/2011 | Hunter |
| 7,971,637 B2 | 7/2011 | Duhon et al. |
| 7,975,768 B2 | 7/2011 | Fraser et al. |
| 8,118,106 B2 | 2/2012 | Wiens et al. |
| 8,141,642 B2 | 3/2012 | Olstad et al. |
| 8,210,268 B2 | 7/2012 | Heidecke et al. |
| 8,281,856 B2 | 10/2012 | Jahn et al. |
| 8,307,903 B2 | 11/2012 | Redlinger et al. |
| 8,365,834 B2 | 2/2013 | Liess et al. |
| 8,459,361 B2 | 6/2013 | Leuchtenberg |
| 8,505,984 B2 | 8/2013 | Henderson et al. |
| 8,567,512 B2 | 10/2013 | Odell, II et al. |
| 8,601,910 B2 | 12/2013 | Begnaud |
| 8,636,067 B2 | 1/2014 | Robichaux et al. |
| 8,651,175 B2 | 2/2014 | Fallen |
| 8,668,003 B2 | 3/2014 | Osmundsen et al. |
| 8,708,055 B2 | 4/2014 | Liess et al. |
| 8,727,021 B2 | 5/2014 | Heidecke et al. |
| 8,776,898 B2 | 7/2014 | Liess et al. |
| 8,783,339 B2 | 7/2014 | Sinclair et al. |
| 8,839,884 B2 | 9/2014 | Kuttel et al. |
| 8,893,772 B2 | 11/2014 | Henderson et al. |
| 9,068,406 B2 | 6/2015 | Clasen et al. |
| 9,206,851 B2 | 12/2015 | Slaughter, Jr. et al. |
| 9,528,326 B2 | 12/2016 | Heidecke et al. |
| 9,631,438 B2 | 4/2017 | McKay |
| 2002/0043403 A1 | 4/2002 | Juhasz et al. |
| 2002/0074132 A1 | 6/2002 | Juhasz et al. |
| 2002/0084069 A1 | 7/2002 | Mosing et al. |
| 2002/0129934 A1 | 9/2002 | Mullins et al. |
| 2002/0170720 A1 | 11/2002 | Haugen |
| 2003/0098150 A1 | 5/2003 | Andreychuk |
| 2003/0107260 A1 | 6/2003 | Ording et al. |
| 2003/0221519 A1 | 12/2003 | Haugen |
| 2004/0003490 A1 | 1/2004 | Shahin et al. |
| 2004/0069497 A1 | 4/2004 | Jones et al. |
| 2004/0216924 A1 | 11/2004 | Pietras et al. |
| 2005/0000691 A1 | 1/2005 | Giroux et al. |
| 2005/0173154 A1 | 8/2005 | Lesko |
| 2005/0206163 A1 | 9/2005 | Guesnon et al. |
| 2005/0257933 A1 | 11/2005 | Pietras |
| 2005/0269072 A1 | 12/2005 | Folk et al. |
| 2005/0269104 A1 | 12/2005 | Folk et al. |
| 2005/0269105 A1 | 12/2005 | Pietras |
| 2005/0274508 A1 | 12/2005 | Folk et al. |
| 2006/0037784 A1 | 2/2006 | Walter et al. |
| 2006/0124353 A1 | 6/2006 | Juhasz et al. |
| 2006/0151181 A1 | 7/2006 | Shahin |
| 2006/0180315 A1 | 8/2006 | Shahin et al. |
| 2007/0030167 A1 | 2/2007 | Li et al. |
| 2007/0044973 A1 | 3/2007 | Fraser et al. |
| 2007/0074588 A1 | 4/2007 | Harata et al. |
| 2007/0074874 A1 | 4/2007 | Richardson |
| 2007/0102992 A1 | 5/2007 | Jager |
| 2007/0131416 A1 | 6/2007 | Odell, II et al. |
| 2007/0140801 A1 | 6/2007 | Kuttel et al. |
| 2007/0144730 A1 | 6/2007 | Shahin et al. |
| 2007/0158076 A1 | 7/2007 | Hollingsworth, Jr. et al. |
| 2007/0251699 A1 | 11/2007 | Wells et al. |
| 2007/0251701 A1 | 11/2007 | Jahn et al. |
| 2007/0257811 A1 | 11/2007 | Hall et al. |
| 2008/0059073 A1 | 3/2008 | Giroux et al. |
| 2008/0093127 A1 | 4/2008 | Angman |
| 2008/0099196 A1 | 5/2008 | Latiolais et al. |
| 2008/0125876 A1 | 5/2008 | Boutwell |
| 2008/0202812 A1 | 8/2008 | Childers et al. |
| 2008/0308281 A1 | 12/2008 | Boutwell, Jr. et al. |
| 2009/0151934 A1 | 6/2009 | Heidecke et al. |
| 2009/0159294 A1 | 6/2009 | Abdollahi et al. |
| 2009/0200038 A1 | 8/2009 | Swietlik et al. |
| 2009/0205820 A1 | 8/2009 | Koederitz et al. |
| 2009/0205827 A1 | 8/2009 | Swietlik et al. |
| 2009/0205836 A1 | 8/2009 | Swietlik et al. |
| 2009/0205837 A1 | 8/2009 | Swietlik et al. |
| 2009/0229837 A1 | 9/2009 | Wiens et al. |
| 2009/0266532 A1 | 10/2009 | Revheim et al. |
| 2009/0272537 A1 | 11/2009 | Alikin et al. |
| 2009/0274544 A1 | 11/2009 | Liess |
| 2009/0274545 A1 | 11/2009 | Liess et al. |
| 2009/0316528 A1 | 12/2009 | Ramshaw et al. |
| 2009/0321086 A1 | 12/2009 | Zimmermann |
| 2010/0032162 A1 | 2/2010 | Olstad et al. |
| 2010/0101805 A1 | 4/2010 | Angelle et al. |
| 2010/0200222 A1 | 8/2010 | Robichaux et al. |
| 2010/0206583 A1 | 8/2010 | Swietlik et al. |
| 2010/0206584 A1 | 8/2010 | Clubb et al. |
| 2010/0236777 A1 | 9/2010 | Partouche et al. |
| 2011/0036586 A1 | 2/2011 | Hart et al. |
| 2011/0039086 A1 | 2/2011 | Graham et al. |
| 2011/0088495 A1 | 4/2011 | Buck et al. |
| 2011/0214919 A1 | 9/2011 | McClung, III |
| 2011/0280104 A1 | 11/2011 | McClung, III |
| 2012/0048574 A1 | 3/2012 | Wiens et al. |
| 2012/0152530 A1 | 6/2012 | Wiedecke et al. |
| 2012/0160517 A1 | 6/2012 | Bouligny et al. |
| 2012/0212326 A1 | 8/2012 | Christiansen et al. |
| 2012/0234107 A1 | 9/2012 | Pindiprolu et al. |
| 2012/0298376 A1 | 11/2012 | Twardowski |
| 2013/0055858 A1 | 3/2013 | Richardson |
| 2013/0056977 A1 | 3/2013 | Henderson et al. |
| 2013/0062074 A1 | 3/2013 | Angelle et al. |
| 2013/0075077 A1 | 3/2013 | Henderson et al. |
| 2013/0075106 A1 | 3/2013 | Tran et al. |
| 2013/0105178 A1 | 5/2013 | Pietras |
| 2013/0207382 A1 | 8/2013 | Robichaux |
| 2013/0207388 A1 | 8/2013 | Jansson et al. |
| 2013/0233624 A1 | 9/2013 | In |
| 2013/0269926 A1 | 10/2013 | Liess et al. |
| 2013/0271576 A1 | 10/2013 | Elllis |
| 2013/0275100 A1 | 10/2013 | Ellis et al. |
| 2013/0299247 A1 | 11/2013 | Küttel et al. |
| 2014/0090856 A1 | 4/2014 | Pratt et al. |
| 2014/0116686 A1 | 5/2014 | Odell, II et al. |
| 2014/0131052 A1 | 5/2014 | Richardson |
| 2014/0202767 A1 | 7/2014 | Feasey |
| 2014/0233804 A1 | 8/2014 | Gustavsson et al. |
| 2014/0262521 A1 | 9/2014 | Bradley et al. |
| 2014/0305662 A1 | 10/2014 | Giroux et al. |
| 2014/0326468 A1 | 11/2014 | Heidecke et al. |
| 2014/0352944 A1 | 12/2014 | Devarajan et al. |
| 2014/0360780 A1 | 12/2014 | Moss et al. |
| 2015/0014063 A1 | 1/2015 | Simanjuntak et al. |
| 2015/0053424 A1 | 2/2015 | Wiens et al. |
| 2015/0083391 A1 | 3/2015 | Bangert et al. |
| 2015/0107385 A1 | 4/2015 | Mullins et al. |
| 2015/0337648 A1 | 11/2015 | Zippel et al. |
| 2016/0024862 A1 | 1/2016 | Wilson et al. |
| 2016/0123094 A1* | 5/2016 | Amezaga ............... E21B 19/165 166/380 |
| 2016/0138348 A1 | 5/2016 | Kunec |
| 2016/0145954 A1 | 5/2016 | Helms et al. |
| 2016/0177639 A1 | 6/2016 | McIntosh et al. |

(56) References Cited

U.S. PATENT DOCUMENTS

| | | | |
|---|---|---|---|
| 2016/0215592 | A1 | 7/2016 | Helms et al. |
| 2016/0230481 | A1 | 8/2016 | Misson et al. |
| 2017/0037683 | A1 | 2/2017 | Heidecke et al. |
| 2017/0044854 | A1 | 2/2017 | Hebebrand et al. |
| 2017/0044875 | A1 | 2/2017 | Hebebrand et al. |
| 2017/0051568 | A1 | 2/2017 | Wern et al. |
| 2017/0067303 | A1 | 3/2017 | Thiemann et al. |
| 2017/0067320 | A1 | 3/2017 | Zouhair et al. |
| 2017/0074075 | A1 | 3/2017 | Liess |
| 2017/0211327 | A1 | 7/2017 | Wern et al. |
| 2017/0211343 | A1 | 7/2017 | Thiemann |
| 2017/0284164 | A1 | 10/2017 | Holmes et al. |

FOREIGN PATENT DOCUMENTS

| | | |
|---|---|---|
| AU | 2014215938 A1 | 9/2014 |
| CA | 2 707 050 A1 | 6/2009 |
| CA | 2 841 654 A1 | 8/2015 |
| CA | 2 944 327 A1 | 10/2015 |
| DE | 102007016822 A1 | 10/2008 |
| EP | 0 250 072 A2 | 12/1987 |
| EP | 1 619 349 A2 | 1/2006 |
| EP | 1 772 715 A2 | 4/2007 |
| EP | 1 961 912 A1 | 8/2008 |
| EP | 1 961 913 A1 | 8/2008 |
| EP | 2085566 A2 | 8/2009 |
| EP | 2 322 357 A1 | 5/2011 |
| EP | 3032025 A1 | 6/2016 |
| GB | 1487948 A | 10/1977 |
| GB | 2 077 812 A | 12/1981 |
| GB | 2 180 027 A | 3/1987 |
| GB | 2 228 025 A | 8/1990 |
| GB | 2 314 391 A | 12/1997 |
| WO | 2004/079153 A2 | 9/2004 |
| WO | 2004/101417 A2 | 11/2004 |
| WO | 2007/001887 A2 | 1/2007 |
| WO | 2007/070805 A2 | 6/2007 |
| WO | 2007127737 A2 | 11/2007 |
| WO | 2008005767 A1 | 1/2008 |
| WO | 2009/076648 A2 | 6/2009 |
| WO | 2012100019 A1 | 7/2012 |
| WO | 2012/115717 A2 | 8/2012 |
| WO | 2014056092 A1 | 4/2014 |
| WO | 2015/000023 A1 | 1/2015 |
| WO | 2015/119509 A1 | 8/2015 |
| WO | 2015/127433 A1 | 8/2015 |
| WO | 2015176121 A1 | 11/2015 |
| WO | 2016197255 A1 | 12/2016 |
| WO | 2017/044384 A1 | 3/2017 |
| WO | 2016197255 A9 | 12/2017 |

OTHER PUBLICATIONS

EPO Extended European Search Report dated Jul. 19, 2018, for European Application No. 18159595.0.

EPO Extended European Search Report dated Jul. 17, 2018, for European Application No. 18158050.7.

Cookson, Colter, "Inventions Speed Drilling, Cut Costs," The American Oil & Gas Reporter, Sep. 2015, 2 pages.

Ennaifer, Amine et al., "Step Change in Well Testing Operations," Oilfield Review, Autumn 2014: 26, No. 3, pp. 32-41.

Balltec Lifting Solutions, LiftLOK™ Brochure, "Highest integrity lifting tools for the harshest environments," 2 pages.

Balltec Lifting Solutions, CoilLOK™ Brochure, "Highest integrity hand-held coiled tubing handling tools," 2 pages.

Peters; Tool Coupler for Use With a Top Drive; U.S. Appl. No. 15/656,508, filed Jul. 21, 2017. (Application not attached to IDS.).

Fuehring et al.; Tool Coupler With Rotating Coupling Method for Top Drive; U.S. Appl. No. 15/445,758, filed Feb. 28, 2017. (Application not attached to IDS.).

Bell; Interchangeable Swivel Combined Multicoupler; U.S. Appl. No. 15/607,159, filed May 26, 2017 (Application not attached to IDS.).

Amezaga; Dual Torque Transfer for Top Drive System; U.S. Appl. No. 15/447,881, filed Mar. 2, 2017. (Application not attached to IDS.).

Zouhair; Coupler With Threaded Connection for Pipe Handler; U.S. Appl. No. 15/444,016, filed Feb. 27, 2017. (Application not attached to IDS.).

Liess; Downhole Tool Coupling System; U.S. Appl. 15/670,897, filed Aug. 7, 2017. (Application not attached to IDS.).

Muller et al; Combined Multi-Coupler With Rotating Locking Method for Top Drive; U.S. Appl. No. 15/721,216, filed Sep. 29, 2017. (Application not attached to IDS.).

Amezaga et al; Tool Coupler With Threaded Connection for Top Drive; U.S. Appl. No. 15/457,572, filed Mar. 13, 2017. (Application not attached to IDS.).

Wiens; Combined Multi-Coupler With Locking Clamp Connection for Top Drive; U.S. Appl. No. 15/627,428, filed Jun. 19, 2017. (Application not attached to IDS.).

Henke et al.; Tool Coupler With Sliding Coupling Members for Top Drive; U.S. Appl. No. 15/448,297, filed Mar. 2, 2017. (Application not attached to IDS.).

Schoknecht et al.; Combined Multi-Coupler With Rotating Fixations for Top Drive; U.S. Appl. No. 15/447,926, filed Mar. 2, 2017. (Application not attached to IDS.).

Metzlaff et al.; Combined Multi-Coupler for Top Drive; U.S. Appl. No. 15/627,237, filed Jun. 19, 2017. (Application not attached to IDS.).

Liess; Combined Multi-Coupler for Top Drive; U.S. Appl. No. 15/656,914, filed Jul. 21, 2017. (Application not attached to IDS.).

Liess et al.; Combined Multi-Coupler; U.S. Appl. No. 15/656,684, filed Jul. 21, 2017. (Application not attached to IDS).

Amezaga et al.; Tool Coupler With Data and Signal Transfer Methods for Top Drive; U.S. Appl. No. 15/730,305, filed Oct. 11, 2017. (Application not attached to IDS).

Liess; Tool Coupler With Threaded Connection for Top Drive; U.S. Appl. 15/806,560, filed Nov. 8, 2017. (Application not attached to IDS).

EPO Extended European Search Report dated Oct. 5, 2018, for European Patent Application No. 18173275.1.

A123 System; 14Ah Prismatic Pouch Cell; Nanophosphate® Lithium-Ion; www.a123systems.com; date unknown; 1 page.

Streicher Load/Torque Cell Systems; date unknown; 1 page.

3PS, Inc.; Enhanced Torque and Tension Sub with Integrated Turns; date unknown; 2 total pages.

Lefevre, et al.; Drilling Technology; Deeper, more deviated wells push development of smart drill stem rotary shouldered connections; dated 2008; 2 total pages.

PCT Invitaiton to Pay Additional Fees for International Application No. PCT/US2008/086699; dated Sep. 9, 2009; 7 total pages.

PCT Notification of Transmittal of the International Search Report and the Written Opinion of the International Searching Authority for International Application No. PCT/US2008/086699; dated Sep. 11, 2009; 19 total pages.

National Oilwell Varco; Rotary Shoulder Handbook; dated 2010; 116 total pages.

Weatherford; TorkSub™ Stand-Alone Torque Measuring System; dated 2011-2014; 4 total pages.

Australian Examination Report for Application No. 2008334992; dated Apr. 5, 2011; 2 total pages.

European Search Report for Application No. 08 860 261.0-2315; dated Apr. 12, 2011; 4 total pages.

Eaton; Spool Valve Hydraulic Motors; dated Sep. 2011; 16 total pages.

European Extended Search Report for Application No. 12153779.9-2315; dated Apr. 5, 2012; 4 total pages.

Australian Examination Report for Application No. 2012201644; dated May 15, 2013; 3 total pages.

Warrior; 250E Electric Top Drive (250-TON); 250H Hydraulic Top Drive (250-TON); dated Apr. 2014; 4 total pages.

Hydraulic Pumps & Motors; Fundamentals of Hydraulic Motors; dated Jun. 26, 2014; 6 total pages.

Warrior; Move Pipe Better; 500E Electric Top Drive (500 ton-1000 hp); dated May 2015; 4 total pages.

(56) References Cited

OTHER PUBLICATIONS

Canadian Office Action for Application No. 2,837,581; dated Aug. 24, 2015; 3 total pages.
European Extended Search Report for Application No. 15166062.8-1610; dated Nov. 23, 2015; 6 total pages.
Australian Examination Report for Application No. 2014215938; dated Feb. 4, 2016; 3 total pages.
Rexroth; Bosch Group; Motors and Gearboxes; Asynchronous high-speed motors 1 MB for high speeds; dated Apr. 13, 2016; 6 total pages.
Canadian Office Action for Application No. 2,837,581; dated Apr. 25, 2016; 3 total pages.
PCT Notification of Transmittal of the International Search Report and the Written Opinion of the International Searching Authority for International Application No. PCT/US2015/061960; dated Jul. 25, 2016; 16 total pages.
PCT Notification of Transmittal of the International Search Report and the Written Opinion of the International Searching Authority for International Application No. PCT/US2016/049462; dated Nov. 22, 2016; 14 total pages.
PCT Notification of Transmittal of the International Search Report and the Written Opinion of the International Searching Authority for International Application No. PCT/US2016/050542; dated Nov. 25, 2016; 13 total pages.
PCT Notification of Transmittal of the International Search Report and the Written Opinion of the International Searching Authority for International Application No. PCT/US2016/046458; dated Dec. 14, 2016; 16 total pages.
PCT Notification of Transmittal of the International Search Report and the Written Opinion of the International Searching Authority for International Application No. PCT/US2016/047813; dated Jan. 12, 2017; 15 total pages.
PCT Notification of Transmittal of the International Search Report and the Written Opinion of the International Searching Authority for International Application No. PCT/US2016/050139; dated Feb. 20, 2017; 20 total pages.
PCT Notification of Transmittal of the International Search Report and the Written Opinion of the International Searching Authority for International Application No. PCT/US2017/014646; dated Apr. 4, 2017; 14 total pages.
PCT Notification of Transmittal of the International Search Report and the Written Opinion of the International Searching Authority for International Application No. PCT/US2017/014224; dated Jun. 8, 2017; 15 total pages.
European Extended Search Report for Application No. 17152458.0-1609; dated Jun. 8, 2017; 7 total pages.
Australian Examination Report for Application No. 2017200371; dated Sep. 19, 2017; 5 total pages.
European Extended Search Report for Application No. 17195552.9-1614; dated Dec. 4, 2017; 6 total pages.
Australian Examination Report for Application No. 2017200371; dated Feb. 8, 2018; 6 total pages.
Canadian Office Action for Application No. 2,955,754; dated Mar. 28, 2018; 3 total pages.
Australian Examination Report for Application No. 2017200371; dated May 2, 2018; 4 total pages.
Canadian Office Action for Application No. 2,974,298; dated May 16, 2018; 3 total pages.
European Office Action dated Apr. 1, 2019 for Application No. 18173275.1.
EPO Partial European Search Report dated Jul. 31, 2018, for European Application No. 18159597.6.
European Patent Office; Extended Search Report for Application No. 18160808.4; dated Sep. 20, 2018; 8 total pages.
EPO Partial European Search Report dated Oct. 4, 2018, for European Patent Application No. 18159598.4.
EPO Extended European Search Report dated Nov. 6, 2018, for European Application No. 18159597.6.
International Search Report and Written Opinion in PCT/US2018/042812 dated Oct. 17, 2018.
Extended Search Report in application EP18177312.8 dated Nov. 6, 2018.
European Patent Office; Extended European Search Report for Application No. 18157915.2; dated Jun. 6, 2018; 8 total pages.

* cited by examiner

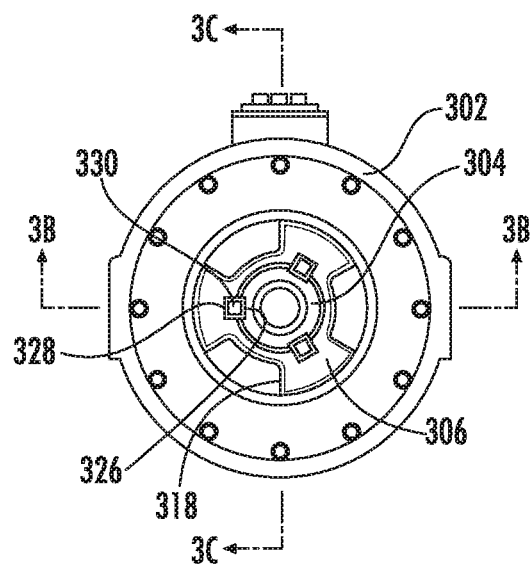
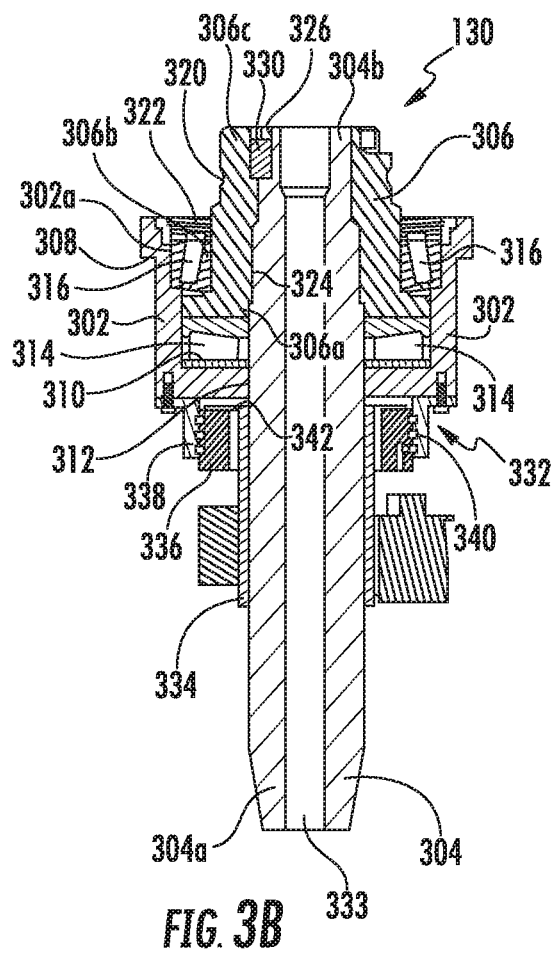
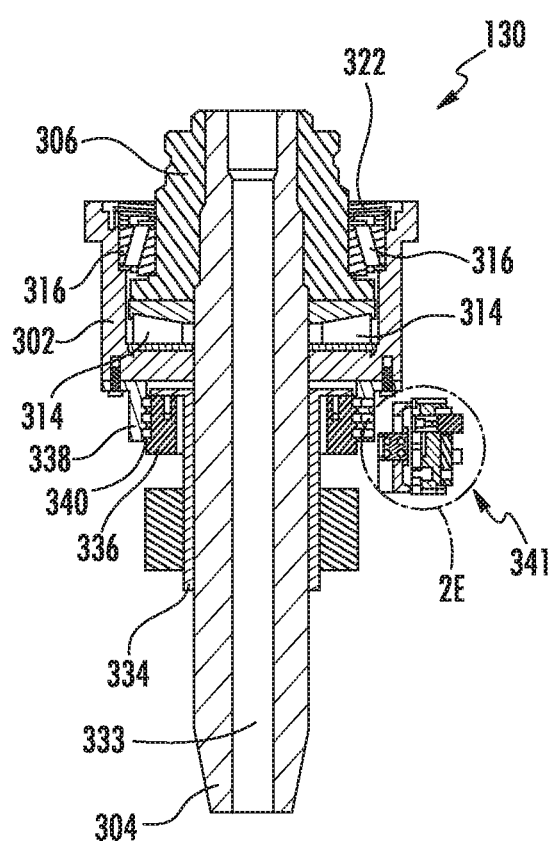
FIG. 3D
FIG. 3B
FIG. 3C

INTERCHANGEABLE SWIVEL COMBINED MULTICOUPLER

BACKGROUND OF THE DISCLOSURE

Field of the Disclosure

The present disclosure generally relates to a combined multicoupler for a top drive.

Description of the Related Art

A wellbore is formed to access hydrocarbon-bearing formations (e.g., crude oil and/or natural gas) or for geothermal power generation by the use of drilling. Drilling is accomplished by utilizing a drill bit that is mounted on the end of a drill string. To drill within the wellbore to a predetermined depth, the drill string is often rotated by a top drive on a drilling rig. After drilling to a predetermined depth, the drill string and drill bit are removed and a string of casing is lowered into the wellbore. An annulus is thus formed between the casing string and the wellbore. The casing string is hung from the wellhead. A cementing operation is then conducted in order to fill the annulus with cement. The casing string is cemented into the wellbore by circulating cement into the annulus defined between the outer wall of the casing and the borehole. The combination of cement and casing strengthens the wellbore and facilitates the isolation of certain areas of the formation behind the casing for the production of hydrocarbons.

During a drilling and well construction operation, various tools are used which have to be attached to the top drive. The process of changing tools is very time consuming and dangerous requiring personnel to work at heights.

Therefore, there is a need for a coupler for quickly connecting and disconnect the top drive and various tools.

SUMMARY OF THE DISCLOSURE

The present disclosure generally relates to a combined multicoupler for connecting a tool to a top drive.

One embodiment of the present disclosure provides a coupler for a top drive. The coupler includes a load frame having a frame body having a load shoulder, and a side door coupled to the frame body. The side door opens from the frame body to allow a tool sliding horizontally into the load shoulder, and the side door closes to lock the tool in the load frame. The coupler further includes a drive stem movably coupled to the load frame, wherein the drive stem moves vertically to connect and disconnect with the tool in the load frame.

Another embodiment of the present disclosure provides a tool dock for connecting a tool to a top drive. The tool dock includes a housing having a load shoulder formed on an outer surface, a drive sleeve rotatably disposed in the housing, wherein the drive sleeve has a load profile and a central bore for receiving a tool mandrel therein, and a hydraulic swivel attached to the housing.

Another embodiment provides a method for connecting a tool to a top drive. The method includes moving a tool having to a tool dock horizontally to slide the tool dock into a load shoulder of a load frame and couple a hydraulic multicoupler on the tool with a hydraulic multicoupler on the load frame, closing a side door of the load frame to lock the tool into the load frame, and lowering a drive stem towards to the tool dock to connect the drive stem to the tool dock.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 3B and 3C are sectional side views of the tool dock of FIG. 3A.

FIG. 3D is a top view of the tool dock of FIG. 3A.

Figure 1:
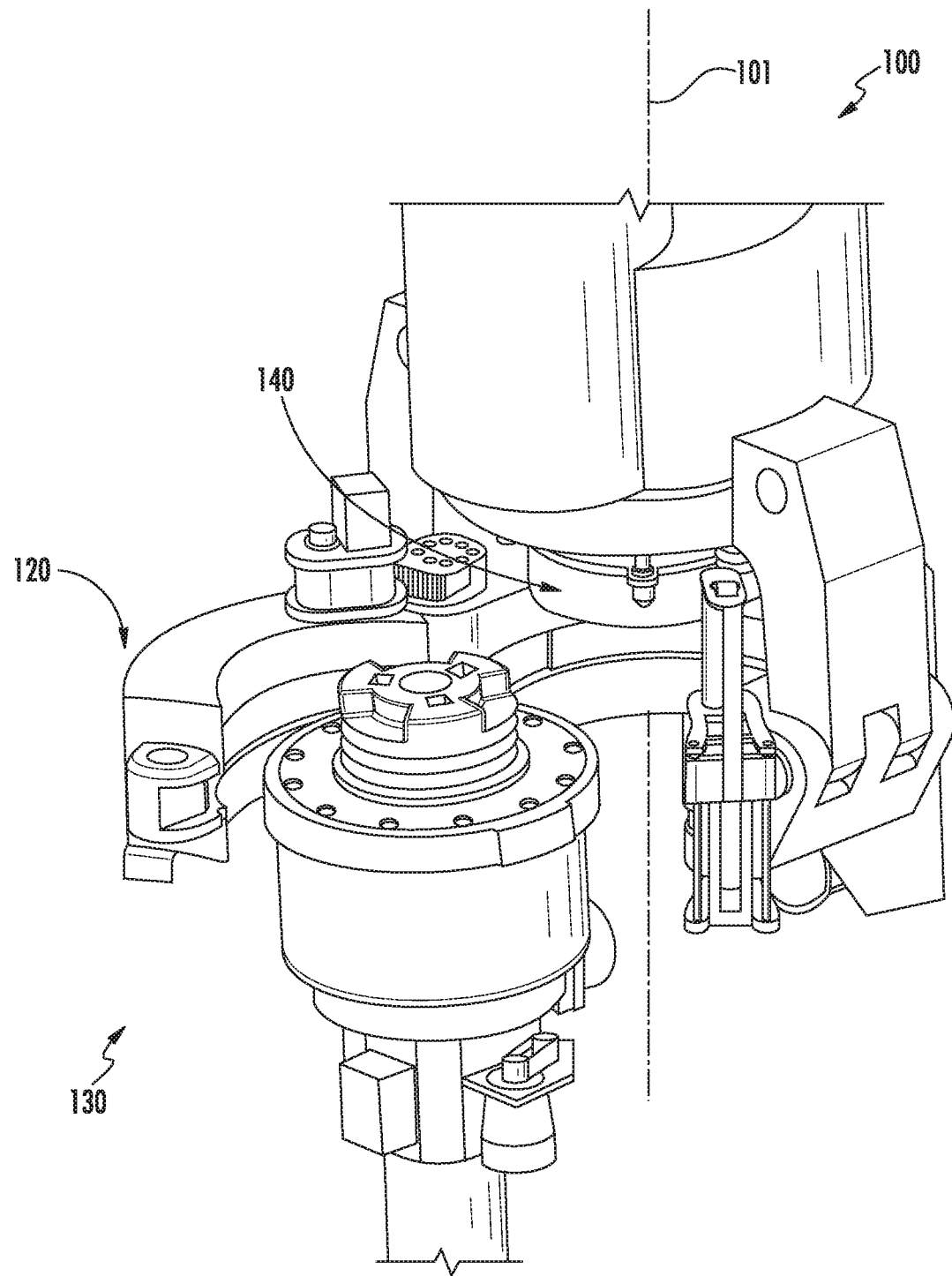
FIG. 1 is a schematic perspective view of a combined multicoupler system according to one embodiment of the present disclosure.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

FIG. 1 is a schematic perspective view of a combined multicoupler system 100 according to one embodiment of the present disclosure. The combined multicoupler system 100 includes a load frame 120 for connecting to a hook on a derrick. A tool dock 130 may be inserted into the load frame 120. The tool dock 130 is configured to house a tool, such as a tool attached to a. The load frame 120 may have a load shoulder to transfer axial load from a drilling string attached to the tool dock 130 to the derrick. The combined multicoupler system 100 further includes a drive stem 140. The drive stem 140 may be movably coupled to the load frame 120. The drive stem 140 may move relative to the load frame 120 along a vertical axis 101 to connect with or disconnect from the tool dock 130. When connected to the tool dock 130, the drive stem 140 may transfer torsional load to the tool dock 130.

Figure 2A:
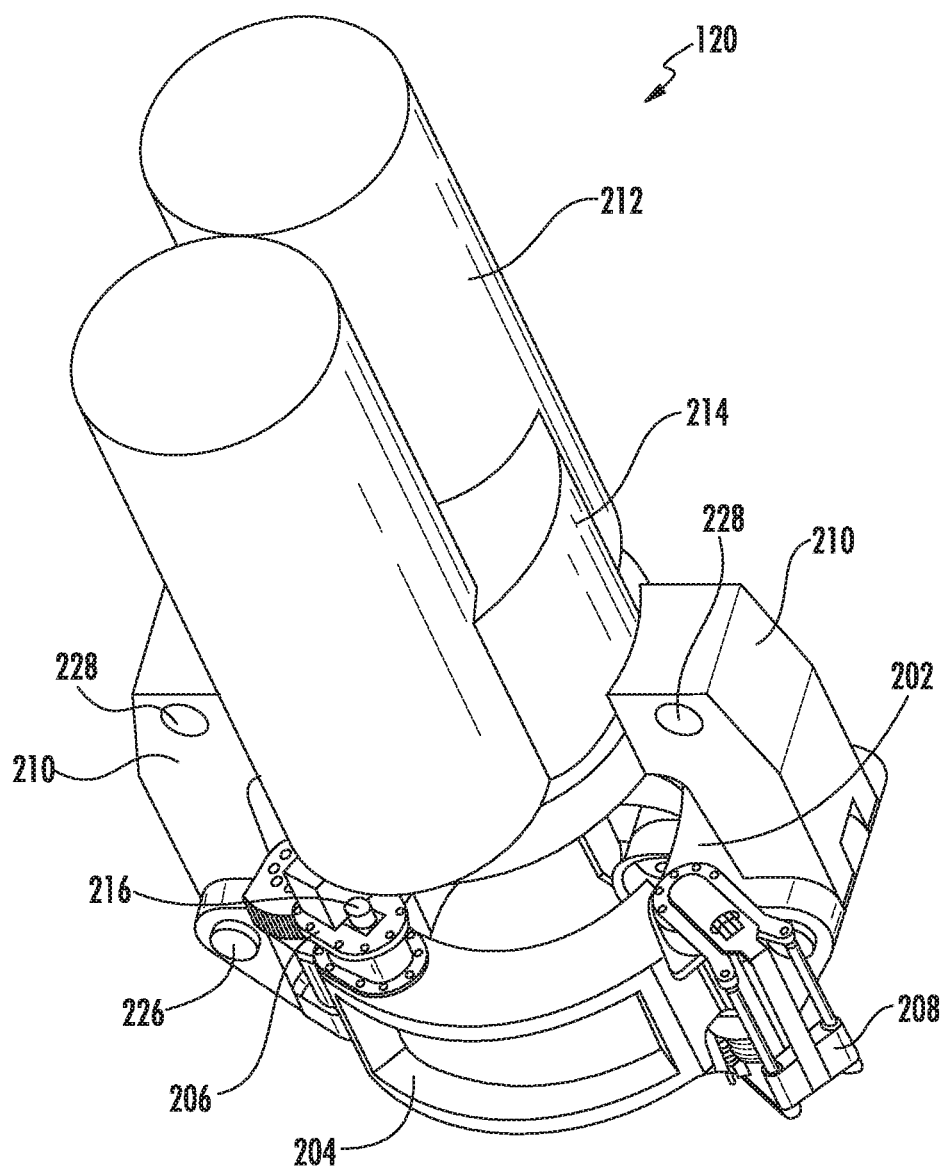
FIG. 2A is a perspective view of a load frame according to one embodiment of the present disclosure.
Figure 2D:
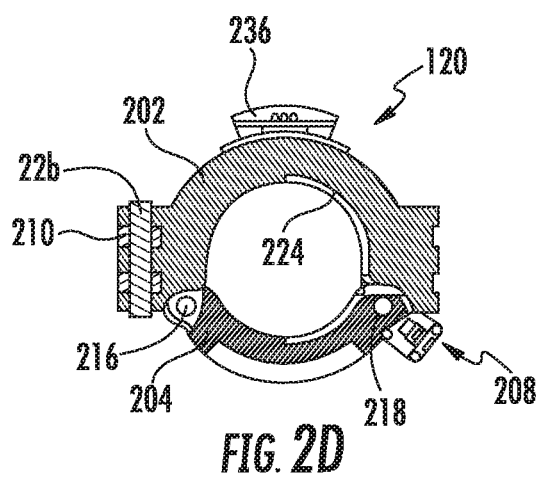
FIG. 2D is a sectional top view of the load frame of FIG. 2A.
Figure 2B:
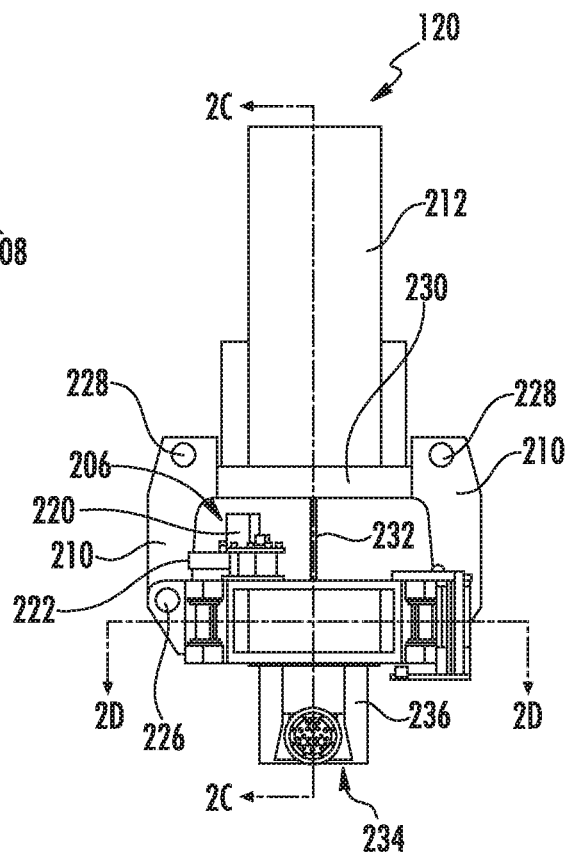
FIGS. 2B and 2C are sectional side views of the load frame of FIG. 2A.
Figure 2C:
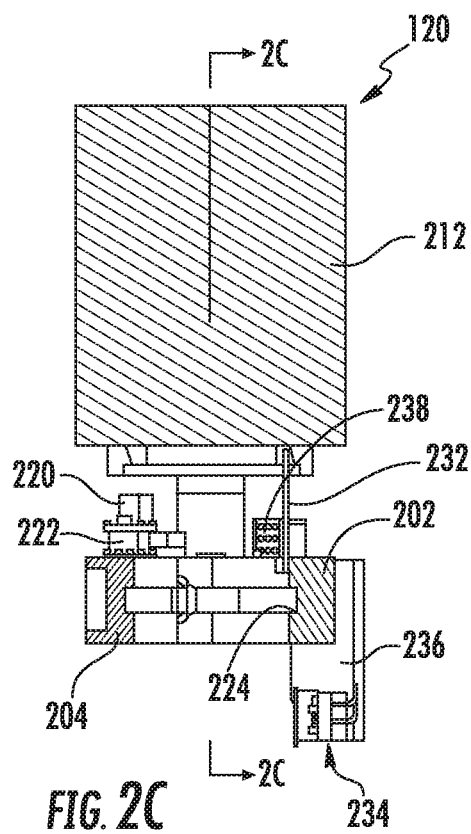

FIG. 2A is a perspective view of the load frame 120 according to one embodiment of the present disclosure. FIGS. 2B and 2C are sectional side views of the load frame 120. FIG. 2D is a sectional top view of the load frame 120.

The load frame 120 includes a C-shaped frame body 202 and a side door 204. A load shoulder 224 is formed in the frame body 202 and the side door 204 for receiving the tool dock 130 and transferring axial loads. The frame body 202 and the side door 204 is movably coupled together, such as by a hinge pin 216, so that the side door 204 can be opened and closed. When the side door 204 is in an open position, as shown in FIG. 1, a tool dock, such as the tool dock 138, can be inserted or removed from the load frame 120 by moving along a horizontal direction into the frame body 202. The side door 204 is closed, as shown in FIG. 2A, to hold the tool dock 130 for operation.

In one embodiment, the load frame 120 includes a door actuating assembly 206 for automatically opening and closing the side door 204. In one embodiment, the door actuating assembly 206 includes an actuator 220 and a gear assembly 222.

In one embodiment, a locking pin 218 is inserted through the frame body 202 and the side door 204 to lock the side door 204 in the closed position. In one embodiment, the load frame 120 includes a pin puller assembly 208 that is used to insert the locking pin 218 to lock the side door 204 and to pull the locking pin 218 to unlock the side door 204. In one embodiment, the pin puller assembly 208 includes a hydraulic actuator to move the locking pin 218.

The load frame 120 may include one or more linkages 210 for connecting to the load frame 120 to a derrick. In one embodiment, the linkage 210 has two link arms 210 attached to the frame body 202. Each link arm 210 is connected to the frame body 202 through a link pin 226 at one end. Each link arm 210 include a link structure, such as a through hole 228, on another end. The through hole 228 receives a link pin to connect with the derrick, such as a travelling block on the derrick.

In one embodiment, the load frame 120 includes a proximity sensor array 238. The proximity sensor array 238 may be disposed on the frame body 202. The proximity sensor array 238 can be used to detect a position of a tool dock being installed or to measure a distance of the tool dock being installed. When the tool dock is in position, the side door 204 can be closed so the tool dock can be securely positioned in the load frame 120.

Figure 2E:
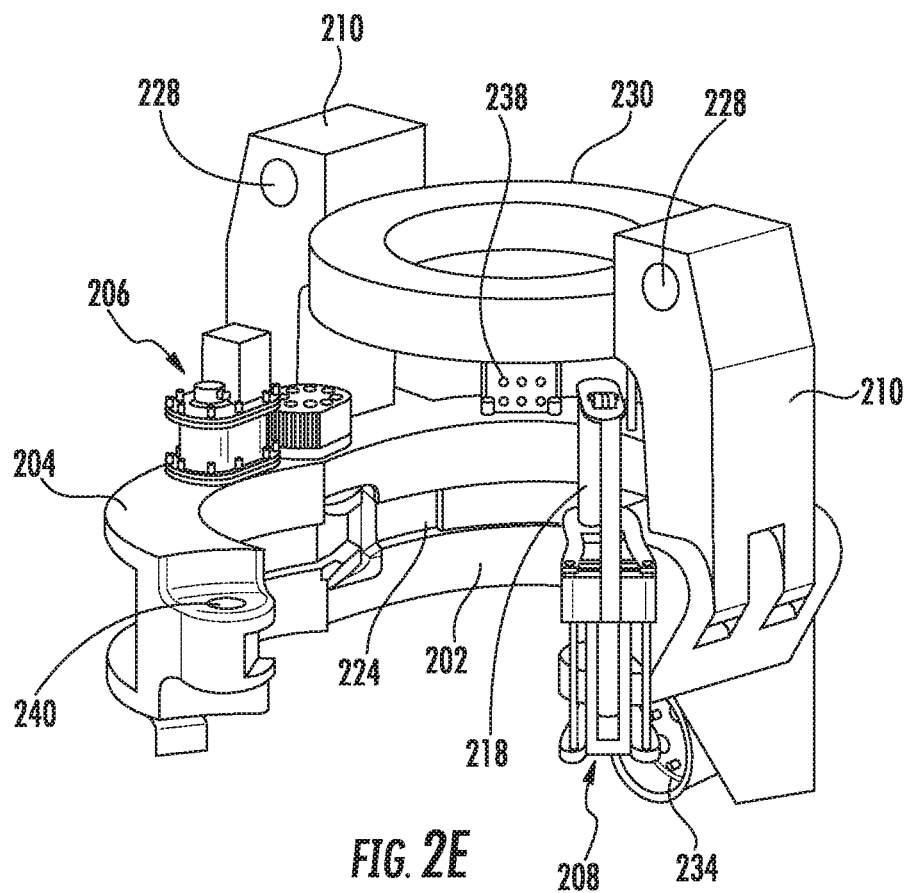
FIG. 2E is a perspective view of a door actuating assembly of the load frame of FIG. 2A.

The load frame 120 may further include a drive support 230 for supporting a drive unit 212. The drive support 230 may be a ring shaped body coupled between the link arms 210. FIG. 2E is a perspective view the load frame 120 showing the support 230 with the drive unit 212 removed. The drive unit 212 may include one or more electric motors. In one embodiment, a gear box 214 may be connected to the drive unit 212. The gear box 214 may be used to connect the motors to a drive stem, such as the drive stem 140. The drive unit 212 may be used to rotate the drive stem attached thereto.

In one embodiment, the load frame 120 includes a guide rail 232 to guide vertical movements of a drive stem attached to the drive unit 212. The guide rail 232 may be fixedly attached to the frame body 202. The drive stem 140 may move up along the guide rail 232 to allow removal and installation of a tool dock.

In one embodiment, the load frame 120 further includes a hydraulic multicoupler 234. The hydraulic multicoupler 234 may be attached to a bracket 236. The bracket 236 may be attached to the frame body 202. The bracket 236 may extend downward from the frame body 202. The hydraulic multicoupler 234 is positioned to couple with a hydraulic manifold on a tool dock when the tool dock is connected to the load frame 120. In one embodiment, the hydraulic multicoupler 234 may be mounted on a spherical bearing to accommodate misalignment between the tool dock and the load frame 120.

Figure 2F:
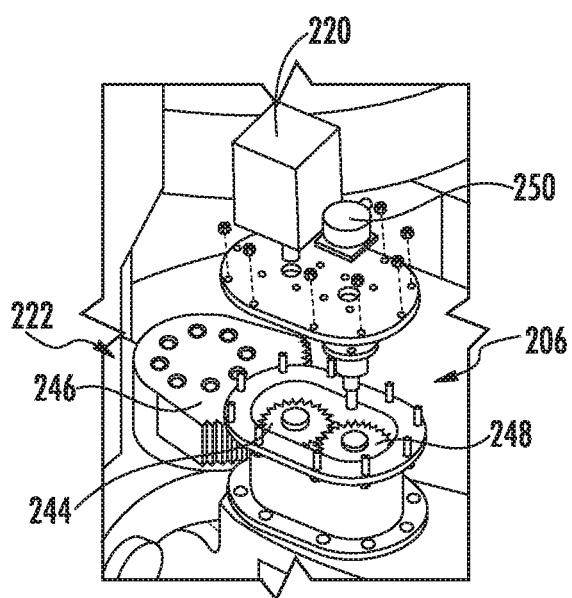
FIG. 2F is a perspective view of a gear assembly of the door actuating assembly of FIG. 2E.

FIG. 2E is a perspective view of the load frame 120 showing the side door 204 in the open position. The side door 204 may swing open or close relative to the frame body 202 by the door actuating assembly 206. The gear assembly 222 of the door actuating assembly 206 may be disposed on the frame body 202 and the side door 204. FIG. 2F is a partial perspective view of the gear assembly 222 of the door actuating assembly of FIG. 2E.

The gear assembly 222 may include a drive gear 244 meshed with a driven gear 246. In FIG. 2F, the drive gear 244 is disposed on the side door 204 and the driven gear 246 is disposed on the frame body 202. Alternatively, the drive gear 244 may be disposed on the frame body 202 and the driven gear 246 may be disposed on the side door 206. As shown in FIG. 2F, the drive gear 244 is connected to the actuator 220. In one embodiment, the actuator 220 may be a rotary hydraulic actuator. The actuator 220 may rotate the drive gear 244 causing the side door 204 to swing open or close through the coupling between the drive gear 244 and the driven gear 246. In one embodiment, the drive gear 244 may be further coupled to an idle gear 248. The idle gear 248 is further coupled to a turns counter 250. The turns counter 250 may be used to sense intermittent positions of the side doors 204 while the side door 206 is being opened or being closed.

Figure 2G:
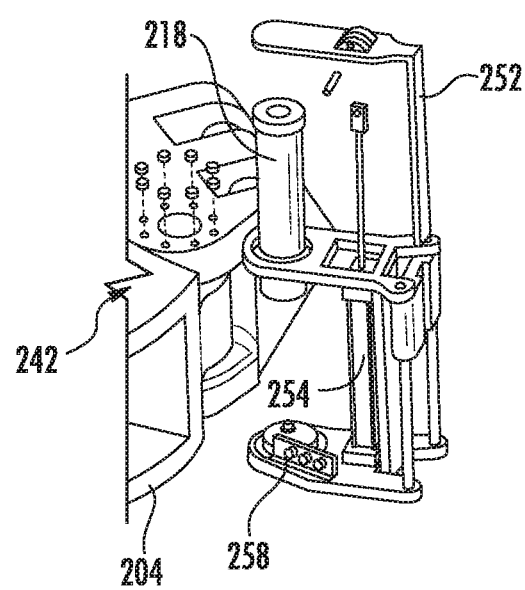
FIG. 2G is a perspective view of a pin puller assembly of the load frame of FIG. 2A.

FIG. 2G is a partial exploded view of the load frame 120 showing the pin puller assembly 208. The pin puller assembly 208 may include a cantilever arm 252. A hydraulic cylinder 254 may be connected to the cantilever arm 252 to move raise and lower the cantilever arm 252. The lock pin 218 is attached to the cantilever arm 252. Movements of the cantilever arm 252 pull the lock pin 218 from the frame body 202 or insert the lock pin 218 into the frame body 202. The side door 204 has a through hole 240 formed at an end. When the side door 204 is closed, the through hole 240 aligns with through holes 242 in the frame body 202 so that the lock pin 218 may be inserted through the through holes 240 and 242 to lock the side door 204 to the frame body 202 at the closed position.

In one embodiment, the load frame 120 may also include a sensor assembly 258 disposed on or near the pin puller assembly 208. The sensor assembly 258 may include one or more proximity sensors to confirm that the side door 204 is closed. The sensor assembly 258 may also include one or more linear transducers configured to detect intermittent positions of the lock pin 218 during locking or unlocking of the side door 204. In one embodiment, the sensor assembly 258 may include a proximity sensor positioned to sense the lock pin 218 when the lock pin 218 is inserted therough the through holes 240, 242, therefore confirming locking of the side door 204.

Figure 3A:
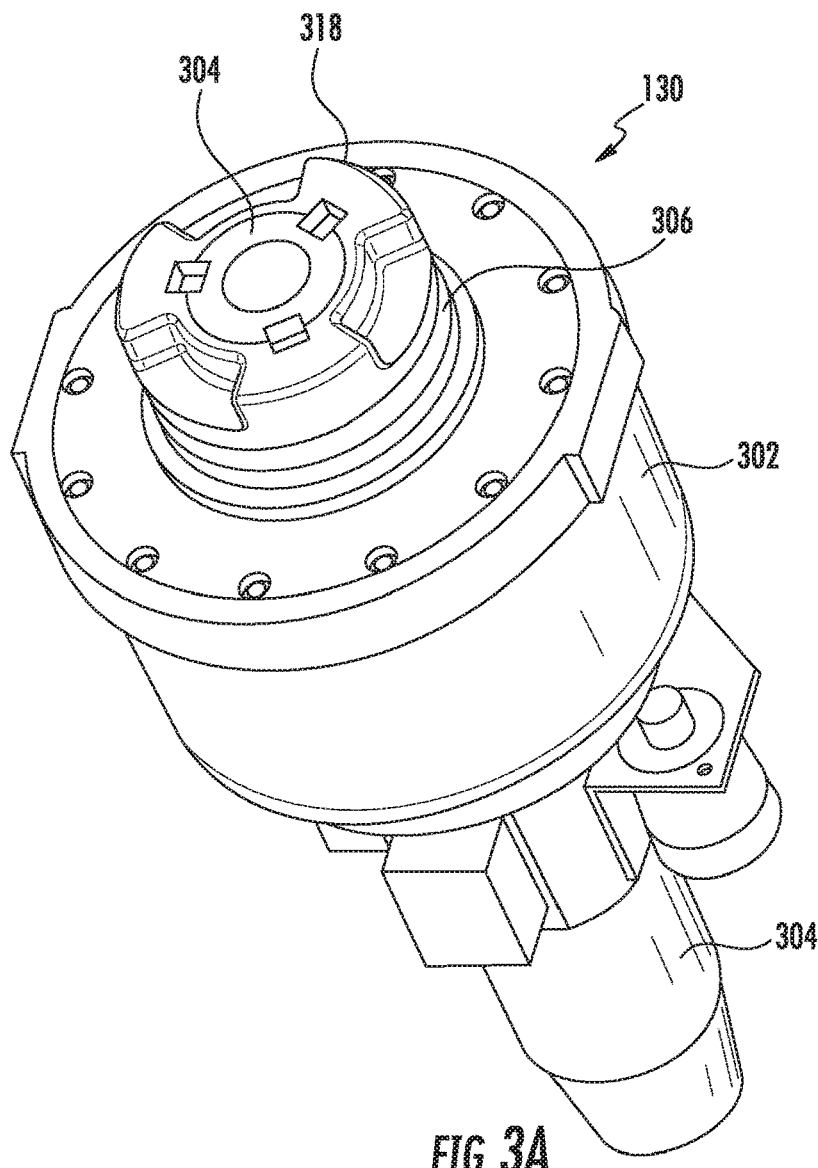
FIG. 3A is a perspective view of a tool dock according to one embodiment of the present disclosure.

FIG. 3A is a perspective view of the tool dock 130 according to one embodiment of the present disclosure. FIGS. 3B and 3C are sectional side views of the tool dock 130. FIG. 3D is a top view of the tool dock 130.

The tool dock 130 may include a housing 302. The housing 302 may be a tubular having an outer shoulder 308 and an inner shoulder 310. The housing 302 may include a central bore 312. The outer shoulder 308 may be inserted into the load shoulder 224 of the load frame 120 when the tool dock 130 is installed in the load frame 120.

The tool dock 130 further includes a drive sleeve 306 disposed in the housing 302. A thrust bearing 314 may be disposed on the inner shoulder 310 in the housing 302. A lower end 306a of the drive sleeve 306 is disposed on the thrust bearing 314. The thrust bearing 314 transfers axial loads between the housing 302 and the drive sleeve 306. A radial bearing 316 may be disposed between an outer surface 306b of the drive sleeve 306 and an inner surface 302a of the housing 302. The radial bearing allows rotation between the drive sleeve 306 and the housing 302. A top cover 322 may be fixedly attached to the housing 302 to prevent the radial bearing 316 and the drive sleeve 306 from moving axially relative to the housing 302.

An upper end 306c of the drive sleeve 306 extends from the housing 302. The upper end 306c may be coupled with a drive stem, such as the drive stem 140, to transfer axial and torsional loads from the drive stem. The upper end 306a may have a torque transfer profile 318 for transferring torsional loads to and from the stem drive 140. In one embodiment, the torque transfer profile 318 may be a bayonet profile. The upper end 306a may further include an axial load profile 320 for transferring axial loads to and from the stem drive 140. In one embodiment, the axial load profile 320 may be a groove for receiving one or more load bearing balls.

A tool mandrel 304 may be coupled to the drive sleeve 306. The tool mandrel 304 may be a part of or be connected to any tools that can be used with a top drive, such as a drilling tool, a casing tool, a cementing tool, a completion tool, a fracturing tool, a pump, a sand screen, a clamping tool, an internal gripping tool, an external gripping tool, an adaptor, or a combination thereof. The tool mandrel 304 may include a central bore 333 for providing a fluid communication for drilling fluid, cement, and other well construction fluids.

In one embodiment, the tool mandrel 304 may be coupled to the drive sleeve 306 by a threaded connection 324. The threaded connection 342 transfers axial loads between the drive sleeve 306 and the tool mandrel 304. A lower end 304a of the tool mandrel 304 may extend from the housing 302. In one embodiment, the lower end 304a may include a connection feature for connecting with a workstring or a tool.

An upper end 304b of the tool mandrel 304 extends into the top end 306c of the drive sleeve 306. In one embodiment, the tool mandrel 304 includes a torsional load transfer profile 326 for transferring torsional loads between the load mandrel 304 and the drive sleeve 306. The drive sleeve 306 may also include a torsional load transfer profile 328 formed on the upper end 306c. In one embodiment, the torsional load transfer profiles 326, 328 may be key ways for receiving one or more torque keys 330 therein.

In one embodiment, the tool dock 130 further includes a hydraulic swivel 332 for providing hydraulic fluid to the tool. The hydraulic swivel 332 may include a rotating sleeve 336 attached to the tool mandrel 304 and a stationary sleeve 338 attached to the housing 302. When the tool mandrel 304 rotates relative to the housing 302, the rotating sleeve 336 rotates relative to the stationary sleeve 338. One or more fluid paths 340 may be formed between the stationary sleeve 338 and the rotating sleeve 336. In one embodiment, the tool dock 130 may include a swivel sleeve 334 attached on an outer surface of the tool mandrel 304. The rotating sleeve 336 may be attached to a flange 342 of the swivel sleeve 334.

Figure 3E:
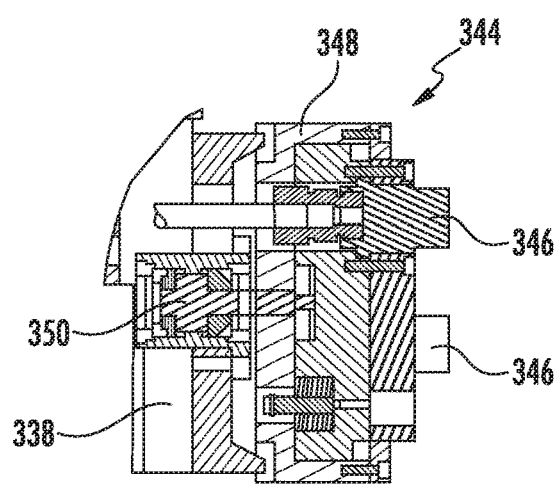
FIG. 3E is a partial enlarged view of the tool dock of FIG. 3A showing a hydraulic multicoupler.

A hydraulic multicoupler 344 may be attached to the housing 304 or to the stationary sleeve 338. FIG. 3E is a partial enlarged view of the tool dock 130 showing the hydraulic multicoupler 344. The hydraulic multicoupler 344 may include a housing 348 having one or more hydraulic connector 346 disposed therein. Each hydraulic connector 346 may be connected to one of the fluid path 340.

The housing 348 may be connected to the housing 304 or the stationary sleeve 338 by a spherical bearing 350. The spherical bearing 350 allows the housing 348 to rotate along three axes to enable alignment between the hydraulic multicoupler 344 and the hydraulic multicoupler 234 on the load frame 120.

Figure 4A:
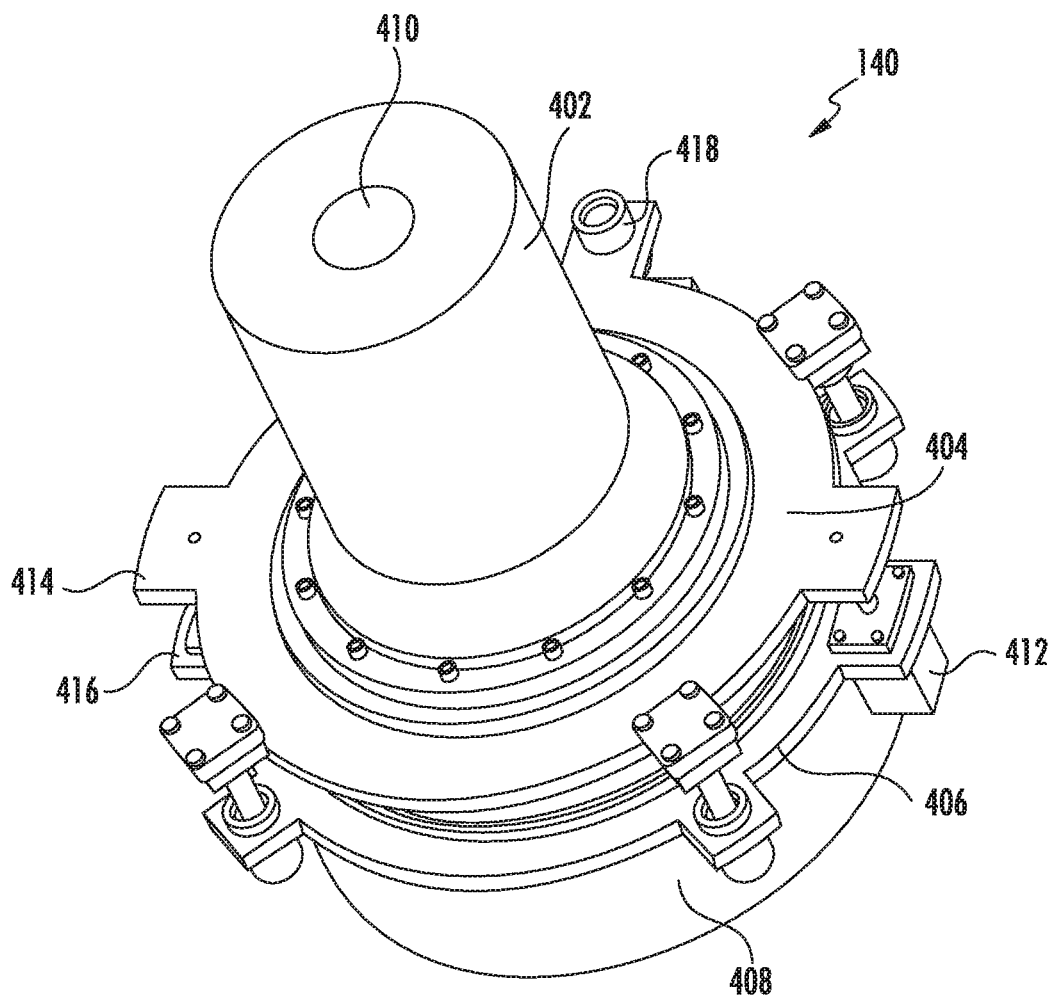
FIG. 4A is a perspective view of a drive stem according to one embodiment of the present disclosure.
Figure 4D:
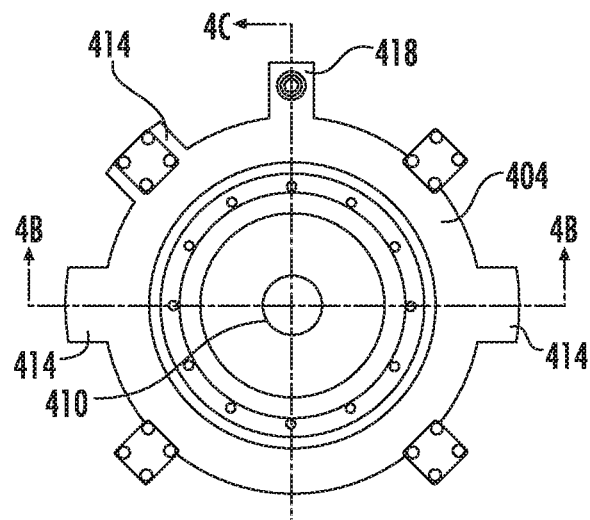
FIG. 4D is a top view of the drive stem of FIG. 4A.
Figure 4C:
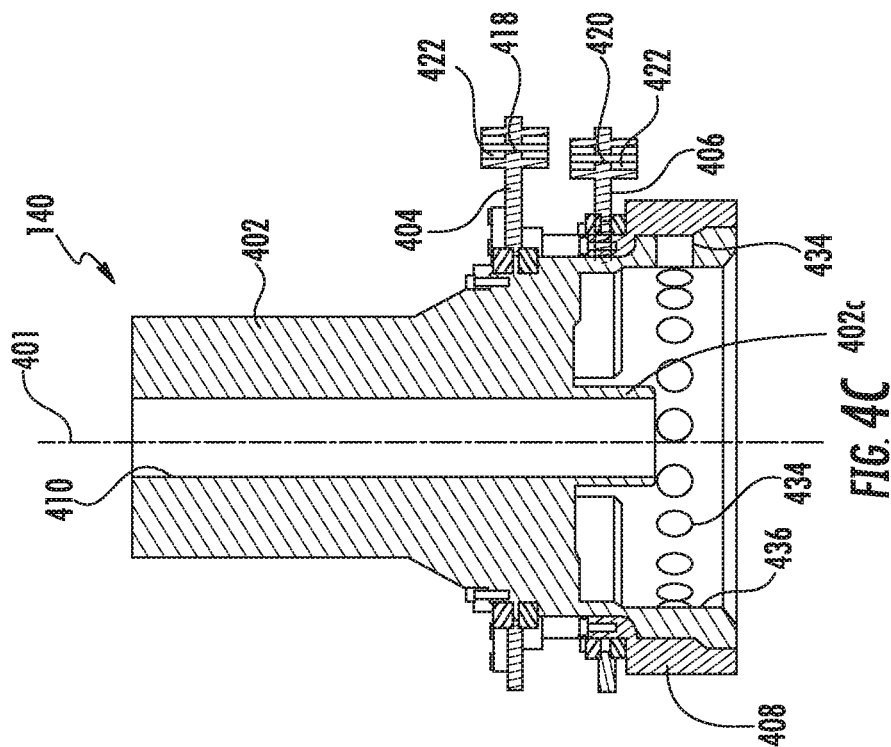
FIGS. 4B and 4C are sectional side views of the drive stem of FIG. 4A.
Figure 4B:
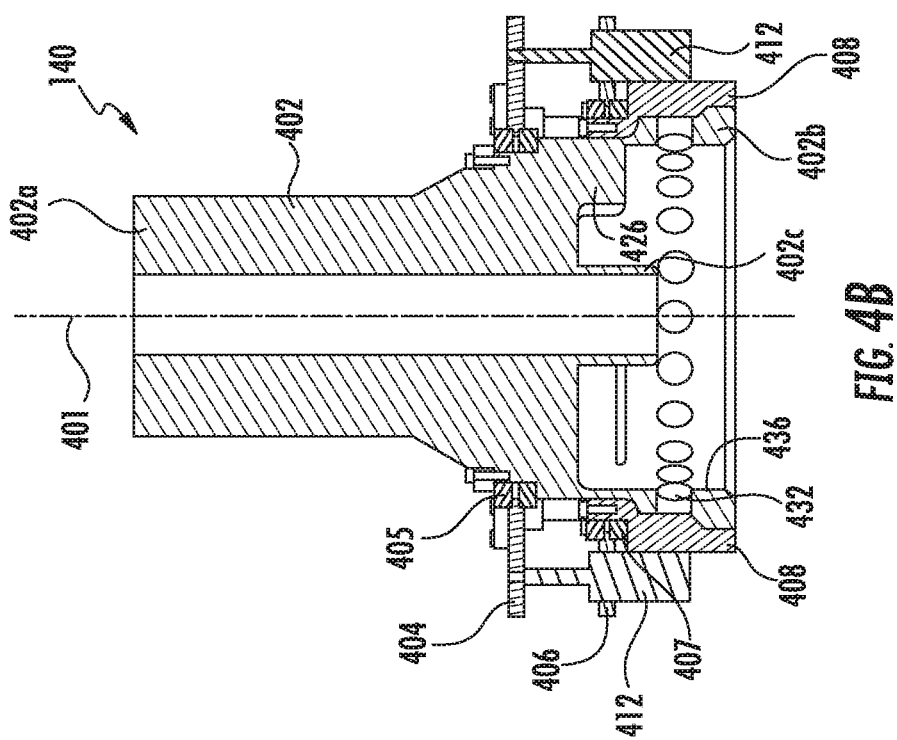

FIG. 4A is a perspective view of the drive stem 140 according to one embodiment of the present disclosure. FIGS. 4B and 4C are sectional side views of the drive stem 140. FIG. 4D is a top view of the drive stem 140.

The drive stem 140 include a stem shaft 402. An index plate 404 may be coupled to the drive shaft 402. The index plate 404 may be coupled to an outer diameter of the drive shaft 402 by a bearing 405 so that the drive shaft 402 is rotatable relative to the index plate 404. The index plate 404 and the drive shaft 402 do not move relative to each other on the longitudinal direction along a central axis 401.

A locking sleeve 408 may be movably attached to the drive shaft 402. An actuation plate 406 may be coupled to the locking sleeve 408. The actuation plate 406 may be coupled to an outer diameter of the locking sleeve 408 by a bearing 407 so that the locking sleeve 408 is rotatable relative to the actuation plate 406. The actuation plate 406 and the locking sleeve 408 do not move relative to each other on the longitudinal direction along the central axis 401.

One or more actuator 412 may be coupled between the index plate 404 and the actuation plate 406 to move the actuation plate 406 and the locking sleeve 408 relative to the drive shaft 402. In one embodiment, the one or more actuator 412 may be one or more pneumatic cylinder. In one embodiment, the one or more actuator 412 may be coupled between one or more tab 414 of the index plate 404 and one or more tab 416 of the actuation plate 406. As shown in FIG. 4A, the drive stem 140 may include two actuators 412. The two actuators 412 may be connected to the index plate 404 at 180° from each other to provide symmetric actuation.

Figure 4E:
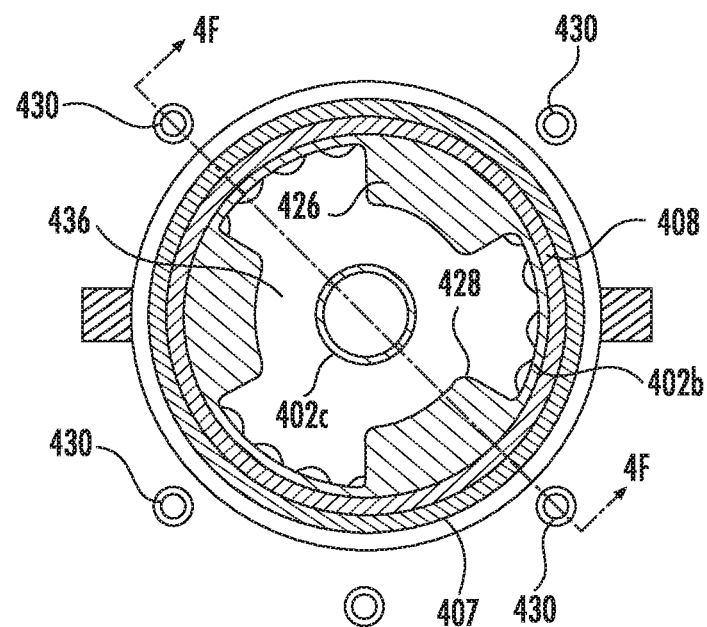
FIG. 4E is a sectional top view of the drive stem of FIG. 4A.
Figure 4F:
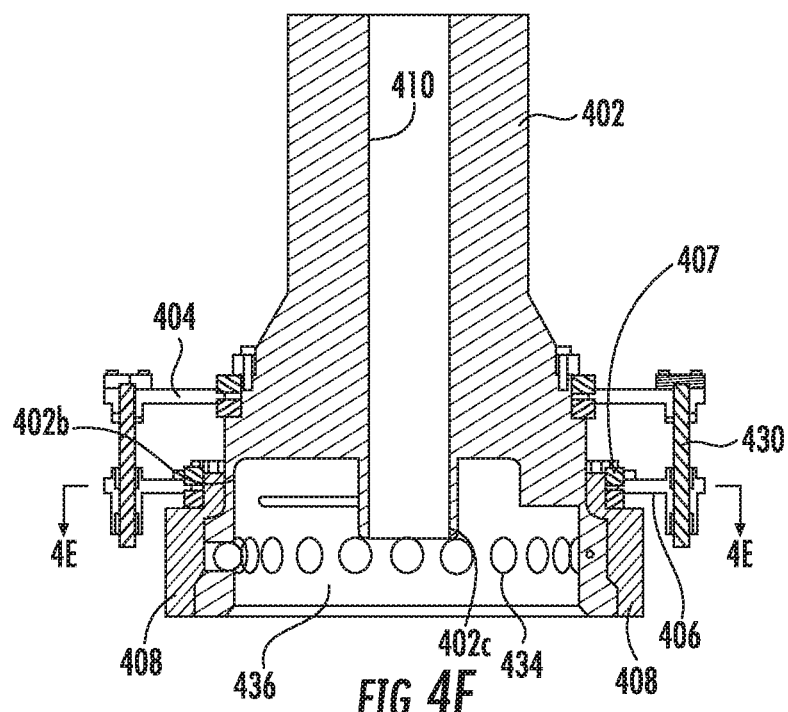
FIG. 4F is a sectional side view of the drive stem of FIG. 4A showing alignment rails.

In one embodiment, the drive stem 140 may include one or more alignment rail 430 disposed between the index plate 404 and the actuation plate 406. FIG. 4F is a sectional side view of the drive stem of FIG. 4A showing the alignment rails 430. In one embodiment, the drive stem 140 may include four alignment rails 430 distributed about 90° from each other, as shown in FIG. 4D.

In one embodiment, the drive stem 140 may include guide openings 418, 420 configured to guide linear movement of the drive stem 140. The guide opening 418 may be formed through the index plate 404. The guide opening 420 may be formed through the actuation plate 406. The guide openings 418, 420 may be aligned along a line parallel to the central axis 401 of the drive stem 140. When the drive stem 140 is installed on the load frame 120, the guide openings 418, 420 receive the guide post 232 of the load frame 120 to direct vertical movements of the drive stem 140. In one embodiment, one or more bearings 422 may be disposed in the guide opening 418, 420.

The stem shaft 402 may include a central bore 410. The stem shaft 402 is configured to connect a drive unit, such as the drive unit 212, to a tool dock, such as the tool dock 130. The stem shaft 402 transfers torsional loads between the drive unit and the tool dock. The central bore 410 is configured to provide a fluid path for working fluids, such as mud, cement, and other well construction fluids.

The stem shaft 402 may include an upper end 402*a* configured to connect with a drive unit and a lower end 402*b* configured to connect with a tool dock. The lower end 402*b* may have an outer diameter larger than an outer diameter of the upper end 402*a*. A tool receiving opening 436 is formed in the lower end 402*b*. The tool receiving opening 436 may be shaped to receive a tool dock, such as the tool dock 130.

A torque transfer profile 428 formed in an inner surface of the tool receiving opening 436. FIG. 4E is a sectional top view of the drive stem 140 showing the torque transfer profile 428 according to one embodiment of the present disclosure. The torque transfer profile 428 may include one or more torque keys 426 formed on the inner surface of the stem shaft 402.

In one embodiment, a plurality of through holes 434 may be formed through the stem shaft 402 at the lower end 402*b*. A lock element 432 is movably disposed in each through hole 434. In one embodiment, the lock element 432 may be a lock ball. Alternatively, the lock element 432 may be in other shapes, such as a cylinder. When the locking sleeve 408 moves down to a locked position, as shown in FIGS. 4B and 4C, the lock elements 432 are pushed radially inward into the tool receiving opening 436 by the locking sleeve 408, thereby, forming an axial load profile to lock a tool dock in an axial position. When the locking sleeve 408 moves up to an unlock position, the lock elements 432 may be pushed radially outward to allow a tool dock in or out the tool receiving opening 436.

A pipe portion 402*c* is formed in the tool receiving opening 436. When a tool dock is inserted in the tool receiving opening 436, the pipe portion 402*c* may be inserted into a central bore of the tool dock to form a fluid path between the central bore 410 and the central bore of the tool dock. In one embodiment, one or more seal element may be disposed on an outer surface of the pipe portion 402 to form a sealed fluid connection with a tool dock.

FIGS. 5A-5E schematically illustrate a sequence coupling the tool dock 130 to the load frame 120 in the combined multicoupler system 100. The side door 204 of the load frame 120 is open and the drive stem 140 is raised to receive the tool dock 130. The tool dock 130 may be moved adjacent to the load frame 120 and aligned with the load frame 120 so that the outer shoulder 308 of the tool dock 130 may be inserted into the load shoulder 224 of the load frame 120. In one embodiment, the outer shoulder 308 and/or the load shoulder 224 may have guidance chamfers formed thereon to provide tolerance in alignment. In one embodiment, the tool dock 130 may be misaligned with the load frame 120 for about ±0.25 inch (or about ±6.5 mm) in vertical and horizontal directions. The proximate sensor array 238 on the load frame 120 may be used to align the tool dock 130 and the load frame 120.

In one embodiment, the alignment of the tool dock 130 may include adjusting the orientation of the tool dock 130 to align the hydraulic multicoupler 344 on the tool dock 130 with the hydraulic multicoupler 244 on the load frame 120.

Figure 5B:
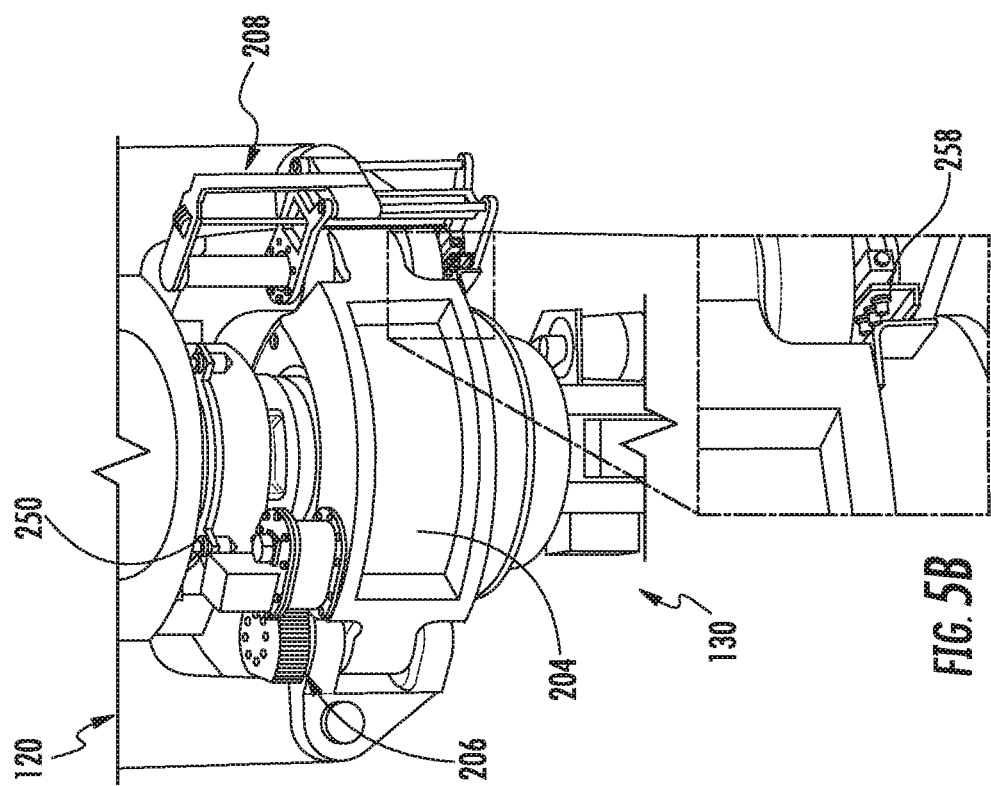
FIGS. 5A-5E schematically illustrate a sequence coupling the tool dock to the load frame in the combined multicoupler system.
Figure 5A:
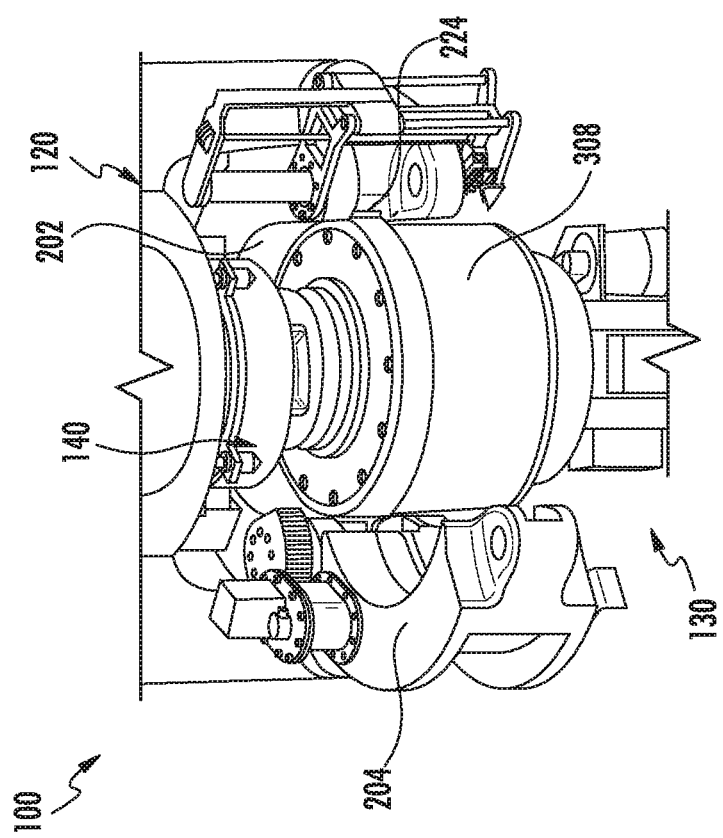

After the tool dock 130 is aligned with the load frame 120, the tool dock 130 may be inserted into the load frame 120 as shown in FIG. 5A. In one embodiment, the proximate sensor array 238 on the load frame 120 may be used to detect the relative position of the tool dock 130 during inserting. When the tool dock 130 is inserted in the load frame 120, the hydraulic multicoupler 344 on the tool dock 130 is also coupled to the hydraulic multicoupler 234 on the load frame 120.

Figure 5C:
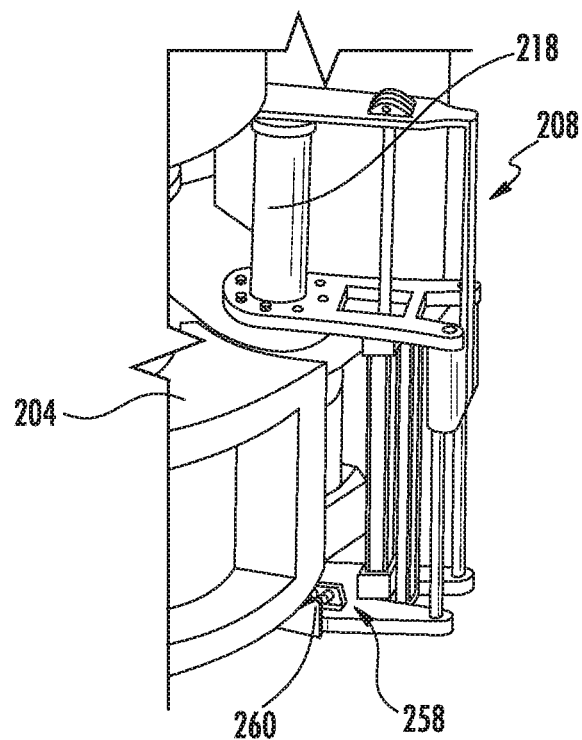

After the tool dock 130 is inserted into the load frame 120, the side door 204 may be closed to secure the tool dock 130 in the load frame 120 as shown in FIG. 5C. The turns counter 250 on the door actuating assembly 206 may be used to intermittent positions of the side door 204. The turns counter 250 may be used to determine whether the side door 204 is closed. In one embodiment, one or more proximity sensors in the sensor assembly 258 may sense the position of the side door 204 to confirm that the side door 204 is closed.

Figure 5D:
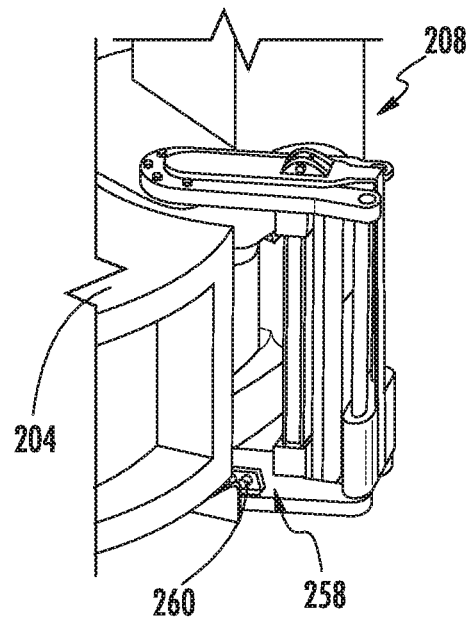
Figure 5E:
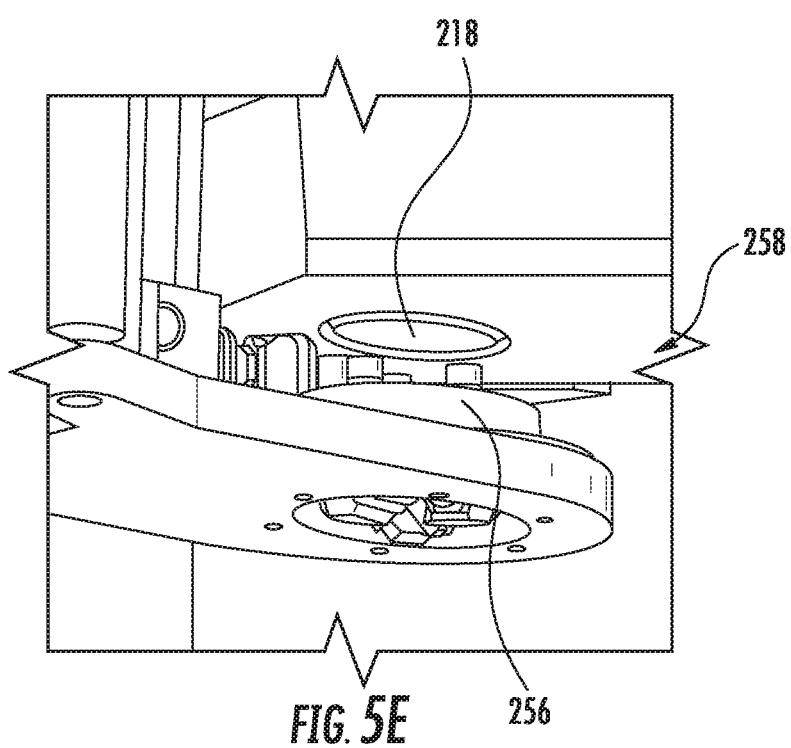

Upon confirmation that the side door 204 is closed, the pin puller assembly 208 may lower the lock pin 218 down to lock the side door 204 to the frame body 202. FIG. 5C is a perspective view of the pin puller assembly 208 with the lock pin 218 in an intermittent position. FIG. 5D is a perspective view of the pin puller assembly 208 with the lock pin 218 in a locked position. In one embodiment, a linear transducer 256 in the sensor assembly 258 may be used to monitor the intermittent positions of the lock pin 218. FIG. 5E schematically illustrates the linear transducer 256. The linear transducer 256 may be used to determine whether the lock pin 218 is in the locking position. In one embodiment, one or more proximity sensors 260, shown in FIG. 5D, in the sensor assembly 258 may be used to detect the lock pin 218 in the locking position, therefore confirming that the side door 204 has been locked.

After the tool dock 130 is coupled to the load frame 120, the drive stem 140 may be coupled to the tool dock 130 for operation. FIG. 6A-6E schematically illustrate a sequence coupling the drive stem 140 to the tool dock 130 in the combined multicoupler system 100.

Figure 6A:
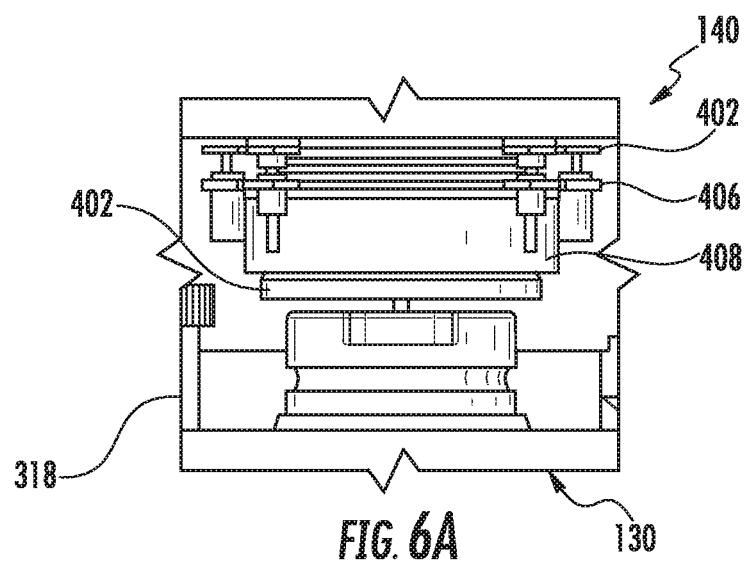
FIG. 6A-6E schematically illustrate a sequence coupling the drive stem to the tool dock in the combined multicoupler system.

FIG. 6A is a schematic side view of the combined multicoupler system 100 after the tool dock 130 is coupled to the load frame 120 and prior to the tool dock 130 is coupled to the drive stem 140. The drive stem 140 is clear from the tool dock 130. The locking sleeve 408 is raised to the unlocked position. At the position shown in FIG. 6A, the drive stem 140 may be rotated to align the torque keys 426 with the torque transfer profile 318 on the tool dock 130.

Figure 6B:
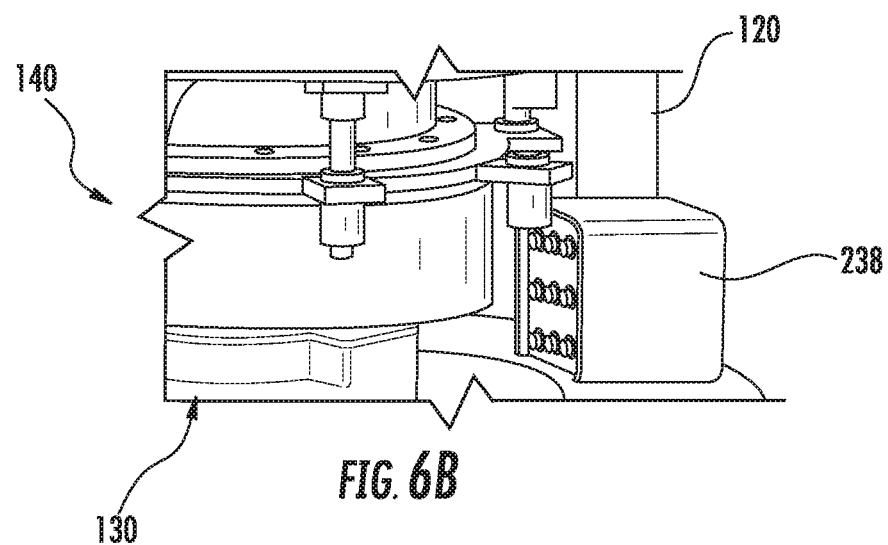

The drive stem 140 may then be lowered toward the tool dock 130 to form a connection therebetween. While lowering the drive stem 140, the proximity sensor array 238 on the load frame 120 may be used to sensing the position of the drive stem 140. FIG. 6B is a schematic perspective view of the combined multicoupler system 100 showing the proximity sensor array 238 relative to the drive stem 140. In one embodiment, the proximity sensor array 238 may be used to sensing the position of the actuation plate 406 to determine the final position of the drive stem 140.

Figure 6C:
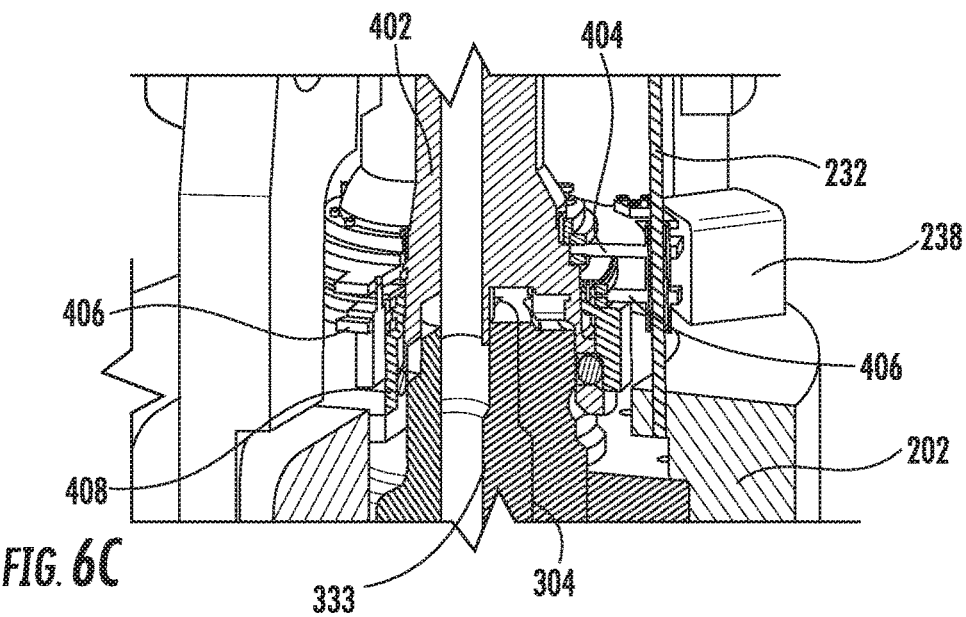
Figure 6D:
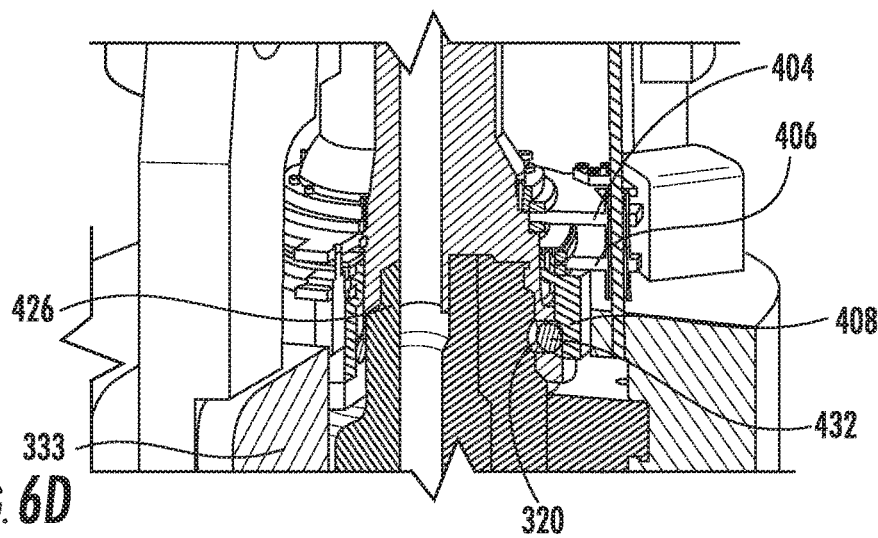

FIGS. 6C-6D are schematic sectional views of the coupling sequence between the drive stem 140 and the tool dock 130. In FIG. 6C, the drive stem 140 is being moved downwardly so that the pipe portion 402*c* of the drive stem 140 is inserted into the central bore 333 of the tool dock 130, and the torque keys 426 of the drive stem 140 mate with the torque transfer profile 318 of the tool dock 130. The vertical movement of the drive stem 140 may be guided by the guide rail 232.

In FIG. 6D, the drive shaft 402 of the drive stem 140 is moved to the target position wherein the torque keys 426 are coupled with the torque transfer profile 318 and the locking elements 432 are aligned with the axial load transfer profile 320. The target position of the drive stem 140 may be monitored and sensed by the proximity sensor array 238. In this position, a fluid path is formed between the central bores 410 and 332, and a torque load transfer path is formed between the torque keys 426 and the torque transfer profile 318.

Figure 6E:
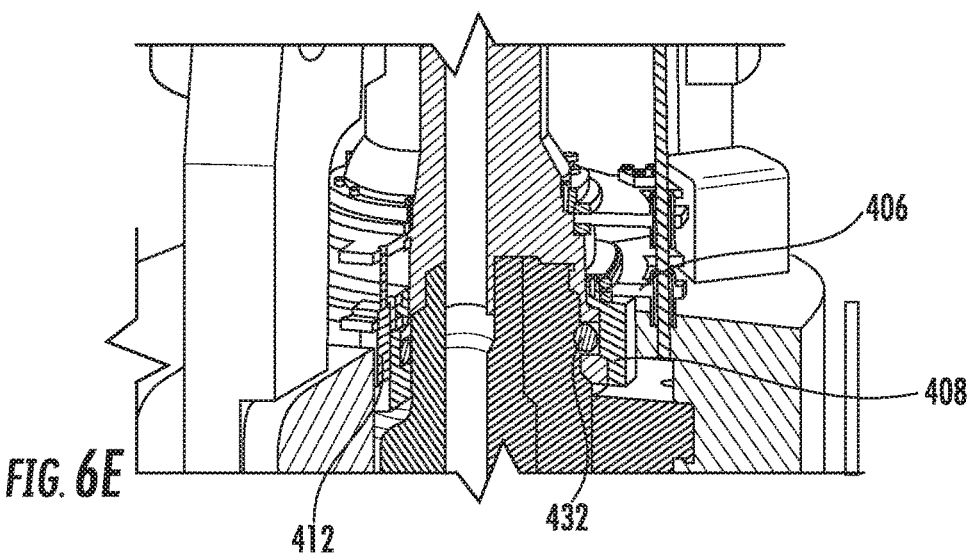

In FIG. 6E, the locking sleeve 408 is lowered to push the locking elements 432 into the axial load profile 320. The actuation plate 406 may move with the locking sleeve 408. The proximity sensor array 238 may be used to detect the position of the actuation plate 406 to determine whether the locking sleeve 408 is in the locked position. The locking elements 432 protrude into the axial load profile 320 therefore providing an axial load transfer path between the tool dock 130 and the drive stem 120.

Embodiments of the present disclosure provide a coupler for a top drive. The coupler includes a load frame comprising a frame body having a load shoulder, and a side door coupled to the frame body, wherein the side door opens from the frame body to allow a tool to move horizontally into the frame body, and the side door closes to lock the tool in the load frame, and a drive stem movably coupled to the load frame, wherein the drive stem moves vertically to connect and disconnect with the tool in the load frame.

In one or more embodiment, the load frame further comprises a hydraulic multicoupler attached to the frame body, wherein the hydraulic multicoupler is positioned to connect with a hydraulic multicoupler on the tool when the tool is inserted into the load shoulder.

In one or more embodiment, the coupler further includes a door actuating assembly coupled to the side door and the frame body, wherein the door actuating assembly automatically opens and closes the side door.

In one or more embodiment, the door actuating assembly comprises a gear assembly connected to the side door, and a motor attached to the gear assembly.

In one or more embodiment, the door actuating assembly further comprises a turns counter coupled to the gear assembly, wherein the turns counter is configured to monitor positions of the side door.

In one or more embodiment, the coupler further includes one or more proximity sensors positioned to detect the side door at the closed position.

In one or more embodiment, the coupler further includes a pin puller assembly for inserting a lock pin between the side door and the load frame when the side door is at the closed position.

In one or more embodiment, the coupler further includes a linear transducer positioned to sensing intermittent positions of the lock pin.

In one or more embodiment, the coupler further includes a sensor assembly attached to the frame body, wherein the sensor assembly comprises one or more proximity sensors positioned to detect positions of the drive stem.

In one or more embodiment, the coupler further includes further comprising a drive unit connected with the load frame, wherein the drive unit is coupled to the drive stem.

In one or more embodiment, the drive stem comprises a drive shaft having a tool receiving opening and a torque profile, a plurality of locking elements movably disposed in the drive shaft, and a locking sleeve disposed over the drive shaft, wherein the locking sleeve is movable between a lock position and a unlock position, the locking sleeve pushes the plurality of locking elements radially inward at the lock position and release the locking elements at the unlock position.

In one or more embodiment, the drive stem further comprises an index plate rotatably coupled to the drive shaft, an actuation plate rotatably coupled to the locking sleeve, and an actuator coupled between the index plate and the actuation plate to move the index plate relative to the actuation plate along an axial direction.

In one or more embodiment, the drive stem further comprises one or more alignment rail disposed between the actuation plate and the index plate.

In one or more embodiment, the load frame comprises a guide rail along the axial direction, and the index plate and the actuator plate include alignment openings receiving the guide rail.

Some embodiments of the present disclosure provide a tool dock for connecting a tool to a top drive. The tool dock includes a housing having a load shoulder formed on an outer surface, a drive sleeve rotatably disposed in the housing, wherein the drive sleeve has a load profile and a central bore for receiving a tool mandrel therein, and a hydraulic swivel attached to the housing.

In one or more embodiment, the load profile includes a groove formed the outer surface of the drive sleeve for receiving one or more load bearing elements, and torque keys formed on the drive sleeve.

In one or more embodiment, the housing has a threaded portion formed on an inner surface the housing for forming a threaded connection with the tool mandrel.

In one or more embodiment, the tool dock further includes one or more torque keys for torsionally coupling the drive sleeve to the tool mandrel.

Some embodiments of the present disclosure provide a method for connecting a tool to a top drive. The method includes horizontally moving a tool connected to a tool dock into a load frame coupled to the top drive, closing a side door of the load frame to lock the tool in the load frame, and lowering a drive stem towards to the tool dock to connect the drive stem to the tool dock.

In one or more embodiment, moving the tool comprises: aligning the tool dock with the load frame, and sliding the tool dock into the load shoulder.

In one or more embodiment, lowering the drive stem comprises aligning a torque transfer profile on the tool dock with a torque transfer profile on the drive stem, lowering the drive stem to the tool dock to torsionally couple the drive stem to the tool dock, and moving one or more locking elements of the drive stem into an axial load transfer profile on the tool dock.

In one or more embodiment, moving the one or more locking elements comprises moving a locking sleeve disposed over the drive stem to push the one or more locking elements toward the tool dock.

In one or more embodiment, the method further includes coupling a hydraulic multicoupler on the tool with a hydraulic multicoupler on the load frame.

While the foregoing is directed to embodiments of the present disclosure, other and further embodiments of the disclosure may be devised without departing from the basic scope thereof, and the scope of the invention is determined by the claims that follow.

The invention claimed is:

1. A coupler for a top drive, comprising:
a tool dock comprising:
a housing having an outer shoulder; and
a drive sleeve rotatably disposed in the housing;
a load frame comprising:
a frame body having a load shoulder engageable with the outer shoulder; and
a side door coupled to the frame body, wherein the side door opens from the frame body to allow the tool dock to move horizontally into the frame body, and the side door closes to lock the tool dock in the load frame; and
a drive stem coupled to the load frame, wherein the drive stem moves vertically to connect and disconnect with the tool dock in the load frame, wherein the drive stem is configured to rotate the drive sleeve.

2. The coupler of claim 1, wherein the load frame further comprises:
a first hydraulic multicoupler attached to the frame body, wherein the first hydraulic multicoupler is positioned to connect with a second hydraulic multicoupler on the tool dock when the tool dock is inserted into the load shoulder.

3. The coupler of claim 1, further comprising a door actuating assembly coupled to the side door and the frame body, wherein the door actuating assembly automatically opens and closes the side door.

4. The coupler of claim 3, wherein the door actuating assembly comprises:
a gear assembly connected to the side door; and
a motor attached to the gear assembly.

5. The coupler of claim 4, wherein the door actuating assembly further comprises:
a turns counter coupled to the gear assembly, wherein the turns counter is configured to monitor positions of the side door.

6. The coupler of claim 4, further comprising one or more proximity sensors positioned to detect the side door at the closed position.

7. The coupler of claim 1, further comprising:
a pin puller assembly for inserting a lock pin between the side door and the load frame when the side door is at the closed position.

8. The coupler of claim 7, further comprising a linear transducer positioned to sensing intermittent positions of the lock pin.

9. The coupler of claim 1, further comprising a sensor assembly attached to the frame body, wherein the sensor assembly comprises one or more proximity sensors positioned to detect positions of the drive stem.

10. The coupler of claim 1, further comprising a drive unit connected with the load frame, wherein the drive unit is coupled to the drive stem.

11. The coupler of claim 1, wherein the drive stem comprises:
a drive shaft having a tool receiving opening and a torque profile;
a plurality of locking elements movably disposed in the drive shaft; and
a locking sleeve disposed over the drive shaft, wherein the locking sleeve is movable between a lock position and a unlock position, the locking sleeve pushes the plurality of locking elements radially inward at the lock position and release the locking elements at the unlock position.

12. The coupler of claim 11, wherein the drive stem further comprises:
an index plate rotatably coupled to the drive shaft;
an actuation plate rotatably coupled to the locking sleeve; and
an actuator coupled between the index plate and the actuation plate to move the index plate relative to the actuation plate along an axial direction.

13. The coupler of claim 12, wherein the drive stem further comprises one or more alignment rail disposed between the actuation plate and the index plate.

14. The coupler of claim 12, wherein the load frame comprises a guide rail along the axial direction, and the index plate and the actuator plate include alignment openings receiving the guide rail.

15. The coupler of claim 1, wherein the tool dock includes a tool mandrel coupled to the drive sleeve.

16. The coupler of claim 15, wherein the tool mandrel is connected to a tool.

17. A coupler for a top drive, comprising:
a load frame comprising:
a frame body having a load shoulder; and
a side door coupled to the frame body, wherein the side door opens from the frame body to allow a tool to move horizontally into the frame body, and the side door closes to lock the tool in the load frame; and
a drive stem movably coupled to the load frame, wherein the drive stem moves vertically to connect and disconnect with the tool in the load frame, wherein the drive stem comprises:
a drive shaft having a tool receiving opening and a torque profile;
a plurality of locking elements movably disposed in the drive shaft; and
a locking sleeve disposed over the drive shaft, wherein the locking sleeve is movable between a lock position and a unlock position, the locking sleeve pushes the plurality of locking elements radially inward at the lock position and release the locking elements at the unlock position.

18. The coupler of claim 17, wherein the drive stem further comprises:
an index plate rotatably coupled to the drive shaft;
an actuation plate rotatably coupled to the locking sleeve; and
an actuator coupled between the index plate and the actuation plate to move the index plate relative to the actuation plate along an axial direction.

19. The coupler of claim 18, wherein the drive stem further comprises one or more alignment rail disposed between the actuation plate and the index plate.

20. The coupler of claim 18, wherein the load frame comprises a guide rail along the axial direction, and the index plate and the actuator plate include alignment openings receiving the guide rail.

21. A coupler for a top drive, comprising:
a tool dock comprising:
a housing having an outer shoulder; and
a drive sleeve rotatably disposed in the housing;
a load frame comprising:
a frame body having a load shoulder engageable with the outer shoulder; and
a side door coupled to the frame body, wherein the side door opens from the frame body to allow the tool dock to move horizontally into the frame body, and the side door closes to lock the tool dock in the load frame.

22. The coupler of claim 21, wherein the tool dock includes a tool mandrel coupled to the drive sleeve.

23. The coupler of claim 22, wherein the tool mandrel is connected to a tool.

\* \* \* \* \*